US012634050B2

(12) United States Patent     (10) Patent No.:   US 12,634,050 B2
Yin et al.     (45) Date of Patent:    May 19, 2026

(54) HARQ-ACK PAYLOAD REDUCTION METHODS FOR UCI MULTIPLEXING WITH DIFFERENT PRIORITIES

(71) Applicant: SHARP KABUSHIKI KAISHA, Osaka (JP)

(72) Inventors: Zhanping Yin, Vancouver, WA (US);
Kai Ying, Vancouver, WA (US);
Kazunari Yokomakura, Osaka (JP);
John Michael Kowalski, Vancouver, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 296 days.

(21) Appl. No.: 18/282,625

(22) PCT Filed: Mar. 18, 2022

(86) PCT No.: PCT/JP2022/012613
§ 371 (c)(1),
(2) Date: Sep. 18, 2023

(87) PCT Pub. No.: WO2022/202662
PCT Pub. Date: Sep. 29, 2022

(65) Prior Publication Data
US 2024/0178943 A1     May 30, 2024

Related U.S. Application Data

(60) Provisional application No. 63/164,335, filed on Mar. 22, 2021.

(51) Int. Cl.
*H04L 1/1829*     (2023.01)

(52) U.S. Cl.
CPC ................................. *H04L 1/1854* (2013.01)

(58) Field of Classification Search
CPC ........................... H04L 1/1854; H04L 1/1621
See application file for complete search history.

(56) References Cited

U.S. PATENT DOCUMENTS

| | | | | |
|---|---|---|---|---|
| 12,232,162 | B2 * | 2/2025 | Park | H04L 1/1854 |
| 2023/0006776 | A1 * | 1/2023 | Yang | H04L 1/00 |
| 2023/0246745 | A1 * | 8/2023 | Ijaz | H04L 1/1861 |
| | | | | 714/726 |
| 2023/0379094 | A1 * | 11/2023 | Yin | H04L 1/1854 |
| 2024/0146467 | A1 * | 5/2024 | Yin | H04L 1/1854 |
| 2024/0322979 | A1 * | 9/2024 | Marinier | H04L 1/1861 |

OTHER PUBLICATIONS

LG Electronics, "Discussion on Intra-UE multiplexing/prioritization", R1-2100883, 3GPP TSG RAN WG1 #104-e, e-Meeting, Jan. 25-Feb. 5, 2021.
Media Tek Inc., "Methods for Intra-UE Multiplexing and Prioritization", R1-2100577, 3GPP TSG RAN WG1 Meeting #104-e, e-Meeting, Jan. 25-Feb. 5, 2020.

* cited by examiner

*Primary Examiner* — Abdullahi Ahmed
(74) *Attorney, Agent, or Firm* — ScienBiziP, P.C.

(57) ABSTRACT

A user equipment (UE) is described. The UE includes a processor configured to determine a hybrid automatic repeat request-acknowledgement (HARQ-ACK) pay load reduction for multiplexing HARQ-ACK with different priorities. The processor is also configured to multiplex the HARQ-ACK with different priorities based on the HARQ-ACK payload reduction. The UE also includes transmitting circuitry configured to transmit the multiplexed HARQ-ACK.

13 Claims, 12 Drawing Sheets

Determine a configured HARQ-ACK payload reduction for multiplexing HARQ-ACK with different priorities on a PUCCH ~1102

Receive multiplexed HARQ-ACK with different priorities on the PUCCH based on the configured HARQ-ACK payload reduction ~1104

1100

Determine a configured HARQ-ACK payload reduction for multiplexing HARQ-ACK with different priorities on a physical uplink shared channel (PUSCH) ⌒1202

Multiplex the HARQ-ACK with different priorities on the PUSCH based on the configured HARQ-ACK payload reduction ⌒1204

Transmit the multiplexed HARQ-ACK on the PUSCH ⌒1206

1200

1302

Determine a configured HARQ-ACK payload reduction for multiplexing HARQ-ACK with different priorities on a PUSCH

1304

Receive multiplexed HARQ-ACK with different priorities on the PUSCH based on the configured HARQ-ACK payload reduction

1300

HARQ-ACK PAYLOAD REDUCTION METHODS FOR UCI MULTIPLEXING WITH DIFFERENT PRIORITIES

CROSS REFERENCE

This Nonprovisional application claims priority under 35 U.S.C. § 119 on provisional Application No. 63/164,335 on Mar. 22, 2021, the entire contents of which are hereby incorporated by reference.

TECHNICAL FIELD

The present disclosure relates generally to communication systems. More specifically, the present disclosure relates to HARQ-ACK payload reduction methods for UCI multiplexing with different priorities.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to: determine a hybrid automatic repeat request-acknowledgement (HARQ-ACK) payload reduction for multiplexing HARQ-ACK with different priorities, and multiplex the HARQ-ACK with different priorities based on the HARQ-ACK payload reduction; and transmitting circuitry configured to transmit the multiplexed HARQ-ACK.

In one example, a base station (gNB), comprising: a processor configured to: determine a hybrid automatic repeat request-acknowledgement (HARQ-ACK) payload reduction for multiplexing HARQ-ACK with different priorities; and receiving circuitry configured to receive multiplexed HARQ-ACK with different priorities based on the HARQ-ACK payload reduction.

In one example, a method by a user equipment (UE), comprising: determining a hybrid automatic repeat request-acknowledgement (HARQ-ACK) payload reduction for multiplexing HARQ-ACK with different priorities; multiplexing the HARQ-ACK with different priorities based on the HARQ-ACK payload reduction; and transmitting the multiplexed HARQ-ACK.

DESCRIPTION OF EMBODIMENTS

Figure 1:
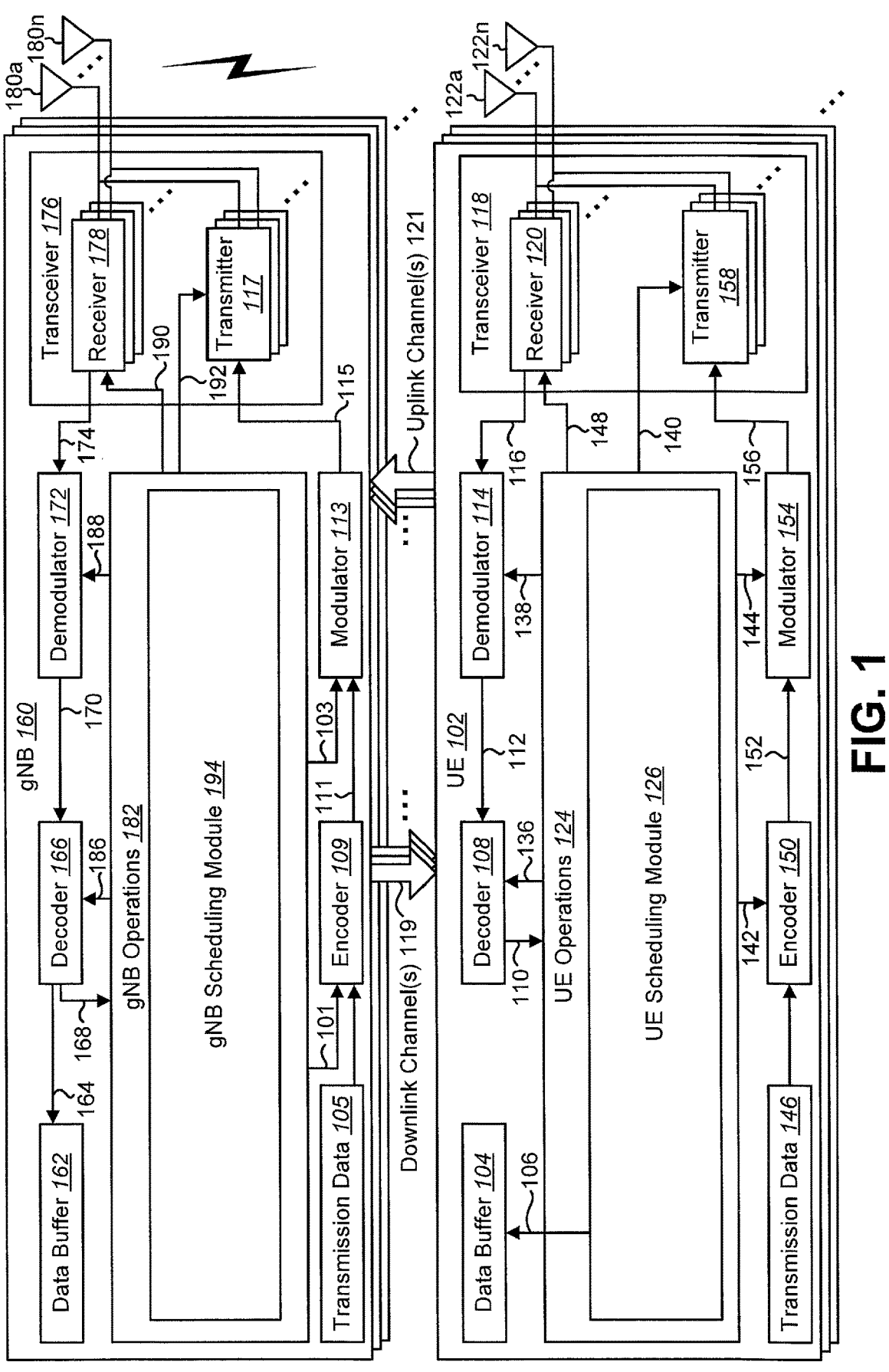
FIG. 1 is a block diagram illustrating one implementation of one or more gNBs and one or more UEs in which systems and methods for hybrid automatic repeat request-acknowledgement (HARQ-ACK) payload reduction and multiplexing may be implemented

An example of a user equipment (UE) is described. The UE includes a processor configured to determine a hybrid automatic repeat request-acknowledgement (HARQ-ACK) payload reduction for multiplexing HARQ-ACK with different priorities. The processor is also configured to multiplex the HARQ-ACK with different priorities based on the HARQ-ACK payload reduction. The UE also includes transmitting circuitry configured to transmit the multiplexed HARQ-ACK.

In some examples, determining the HARQ-ACK payload reduction may include code block group (CBG) level HARQ-ACK compression or bundling with a target CBG configuration.

In some examples, determining the HARQ-ACK payload reduction may include CBG to TB level HARQ-ACK compression or bundling. A CBG HARQ-ACK bit of a TB may be bundled into one bit of a TB level HARQ-ACK.

In some examples, determining the HARQ-ACK payload reduction may include spatial bundling between TBs in a PDSCH transmission.

In some examples, determining the HARQ-ACK payload reduction may include grouping HARQ-ACK bits based on a group size. In one approach, the group size may be configured by higher layer signaling. In another approach, the group size may be determined by a number of HARQ-ACK bits N and a number of bundled HARQ-ACK bits X configured by higher layer signaling.

An example of a base station (gNB) is also described. The gNB includes a processor configured to determine a HARQ-ACK payload reduction for multiplexing HARQ-ACK with different priorities. The gNB also includes receiving circuitry configured to receive multiplexed HARQ-ACK with different priorities based on the HARQ-ACK payload reduction.

An example of a method by a UE is also described. The method includes determining a HARQ-ACK payload reduction for multiplexing HARQ-ACK with different priorities. The method also includes multiplexing the HARQ-ACK with different priorities based on the HARQ-ACK payload reduction. The method further includes transmitting the multiplexed HARQ-ACK.

An example of a method by a gNB is also described. The method includes determining a HARQ-ACK payload reduction for multiplexing HARQ-ACK with different priorities. The method also includes receiving multiplexed HARQ-ACK with different priorities based on the HARQ-ACK payload reduction.

Another example of a UE is described. The UE includes a processor configured to determine a configured HARQ-ACK payload reduction for multiplexing HARQ-ACK with different priorities on a PUCCH. The processor is also configured to multiplex the HARQ-ACK with different priorities on the PUCCH based on the configured HARQ-ACK payload reduction. The UE also includes transmitting circuitry configured to transmit the multiplexed HARQ-ACK on the PUCCH.

A low priority HARQ-ACK payload reduction on PUCCH may be configured by higher layer signaling.

In some examples, multiplexing the HARQ-ACK with different priorities may include evaluating HARQ-ACK payloads without the configured HARQ-ACK payload reduction. The configured HARQ-ACK payload reduction may be applied on a low priority HARQ-ACK if no PUCCH resource can carry all HARQ-ACK bits.

In some examples, multiplexing the HARQ-ACK with different priorities may include always applying the configured HARQ-ACK payload reduction on low priority HARQ-ACK first before performing HARQ-ACK multiplexing on PUCCH.

In some examples, multiplexing the HARQ-ACK with different priorities may include determining the HARQ-ACK payload reduction based on a configured payload threshold. In some examples, multiplexing the HARQ-ACK with different priorities may include determining the HARQ-ACK payload reduction based on an uplink control information (UCI) coding method. In some examples, multiplexing the HARQ-ACK with different priorities may include determining the HARQ-ACK payload reduction based on a combination of a payload threshold and a UCI coding method.

Another example of a gNB is described. The gNB includes a processor configured to determine a configured HARQ-ACK payload reduction for multiplexing HARQ-ACK with different priorities on a PUCCH. The gNB also includes receiving circuitry configured to receive multiplexed HARQ-ACK with different priorities on the PUCCH based on the configured HARQ-ACK payload reduction.

Another example of a method by a UE is described. The method includes determining a configured HARQ-ACK payload reduction for multiplexing HARQ-ACK with different priorities on a PUCCH. The method also includes multiplexing the HARQ-ACK with different priorities on the PUCCH based on the configured HARQ-ACK payload reduction. The method further includes transmitting the multiplexed HARQ-ACK on the PUCCH.

Another example of a method by a gNB is described. The method includes determining a configured HARQ-ACK payload reduction for multiplexing HARQ-ACK with different priorities on a PUCCH. The method also includes receiving multiplexed HARQ-ACK with different priorities on the PUCCH based on the configured HARQ-ACK payload reduction.

Yet another example of a UE is described. The UE includes a processor configured to determine a configured HARQ-ACK payload reduction for multiplexing HARQ-ACK with different priorities on a PUSCH. The processor is also configured to multiplex the HARQ-ACK with different priorities on the PUSCH based on the configured HARQ-ACK payload reduction. The UE also includes transmitting circuitry configured to transmit the multiplexed HARQ-ACK on the PUSCH.

A low priority HARQ-ACK payload reduction on PUSCH may be configured by higher layer signaling.

In some examples, multiplexing the HARQ-ACK with different priorities may include applying the configured HARQ-ACK payload reduction when multiplexing the HARQ-ACK with different priorities on a single PUSCH.

In some examples, multiplexing the HARQ-ACK with different priorities may include applying the configured HARQ-ACK payload reduction when a low priority HARQ-ACK is reported on a high priority PUSCH.

In some examples, multiplexing the HARQ-ACK with different priorities may include applying the configured HARQ-ACK payload reduction when a low priority HARQ-ACK is reported on a low priority PUSCH.

In some examples, the HARQ-ACK payload reduction is configured independently for a PUSCH use case. The PUSCH use case may include one of a low priority HARQ-ACK on a high priority PUSCH; a high priority HARQ-ACK and low priority HARQ-ACK on a high priority PUSCH; and/or a high priority HARQ-ACK and low priority HARQ-ACK on a low priority PUSCH.

In some examples, multiplexing the HARQ-ACK with different priorities may include applying the configured HARQ-ACK payload reduction when a payload threshold is exceeded.

Yet another example of a gNB is described. The gNB includes a processor configured to determine a configured HARQ-ACK payload reduction for multiplexing HARQ-ACK with different priorities on a PUSCH. The gNB also includes receiving circuitry configured to receive multiplexed HARQ-ACK with different priorities on the PUSCH based on the configured HARQ-ACK payload reduction.

Yet another example of a method by a UE is described. The method includes determining a configured HARQ-ACK payload reduction for multiplexing HARQ-ACK with different priorities on a PUSCH. The method also includes multiplexing the HARQ-ACK with different priorities on the PUSCH based on the configured HARQ-ACK payload reduction. The method further includes transmitting the multiplexed HARQ-ACK on the PUSCH.

Yet another method a gNB is described. The method includes determining a configured HARQ-ACK payload reduction for multiplexing HARQ-ACK with different priorities on a PUSCH. The method also includes receiving multiplexed HARQ-ACK with different priorities on the PUSCH based on the configured HARQ-ACK payload reduction.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

HARQ-ACK multiplexing with different priorities may not be supported in current standards. In Release-17, HARQ-ACK multiplexing with different priorities on PUCCH or PUSCH will be supported. One potential issue with HARQ-ACK multiplexing with different priorities is the large payload of the total HARQ-ACK bits, especially when they are reported on a high priority PUCCH or PUSCH channel.

In this disclosure, examples are described for different payload reduction methods at different compressing and bundling levels that may be applied on the low priority HARQ-ACK bits to reduce the UCI resource usage on a PUCCH or a PUSCH. Examples of the configurations and conditions to apply the proposed payload reduction on different PUCCH or PUSCH UCI reporting scenarios are also described herein.

For HARQ-ACK multiplexing on PUCCH, a high priority PUCCH resource may be used to provide the required error probability for high priority HARQ-ACK bits. Compared with high priority HARQ-ACK, the low priority HARQ-ACK may be much larger, especially if code block group (CBG) is configured. In some examples, the large payload of low priority HARQ-ACK may cause poor PUCCH resource utilization. Therefore, payload reduction for the low priority HARQ-ACK codebook may be used to reduce the total HARQ-ACK payload multiplexed on a high priority PUCCH.

Furthermore, the low priority HARQ-ACK payload reduction may be applicable for UCI multiplexing on PUSCH, especially for low priority HARQ-ACK multiplexing on high priority PUSCH. Different configurations may be applied for different scenarios for UCI multiplexing on PUSCH (e.g., high priority HARQ-ACK and low priority HARQ-ACK multiplexing on a single PUSCH).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for hybrid automatic repeat request-acknowledgement (HARQ-ACK) payload reduction and multiplexing may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform HARQ-ACK payload reduction and multiplexing as described herein.

Examples for multiplexing of HARQ-ACK with different priorities on PUCCH or PUSCH are discussed herein. A PUSCH or a PUCCH, including repetitions if any, may be of priority index 0 or of priority index 1. If a priority index is not provided for a PUSCH or a PUCCH, the priority index is 0.

A high priority UCI may be a high priority HARQ-ACK or a high priority SR. The priority of a SR may be indicated in a SR configuration by higher layer signaling. A high priority HARQ-ACK may correspond to a high priority PDSCH transmission. The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, HARQ-ACK or PUCCH resource may be configured to support URLLC services. The high priority may configured with a priority index 1. Thus, a high priority HARQ-ACK is also known as, and interchangeable with, a HARQ-ACK with priority index 1. A high priority PUCCH is also known as, and interchangeable with, a PUCCH with priority index 1. A high priority PUSCH is also known as, and interchangeable with, a PUSCH with priority index 1, and so on.

A low priority UCI may be a low priority HARQ-ACK or a low priority SR, or a CSI report, etc. A low priority HARQ-ACK may correspond to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, HARQ-ACK or PUCCH resource may be configured to support eMBB services. The low priority may configured with a priority index 0. Thus, a low priority HARQ-ACK is also known as, and interchangeable with, a HARQ-ACK with priority index 0. A low priority PUCCH is also known as, and interchangeable with, a PUCCH with priority index 0. A low priority PUSCH is also known as, and interchangeable with, a PUSCH with priority index 0, and so on.

In current NR releases, UCI multiplexing on PUCCH is supported only for UCIs with the same priority. Similarly, UCI multiplexing on PUSCH is supported only for UCIs with the same priority as the PUSCH.

As UCI enhancements in Rel-17, multiplexing of UCI between different priorities may be supported by high layer signaling under some timing restrictions, especially support of high priority HARQ-ACK (e.g., for URLLC) and low priority HARQ-ACK (e.g., for eMBB) on a single PUCCH. For example, if the low priority PUCCH carrying low priority HARQ-ACK may be fully dropped by the high priority PUCCH carrying high priority HARQ-ACK, multiplexing of HARQ-ACK with different priorities on a single PUCCH may be supported. Otherwise, the low priority PUCCH carrying low priority HARQ-ACK may be dropped and the high priority PUCCH carrying high priority HARQ-ACK may be transmitted.

Furthermore, UCI multiplexing on PUSCH with different priorities may also be supported. Thus, a low priority HARQ-ACK may be multiplexed on a high priority PUSCH, and a high priority HARQ-ACK may be multiplexed on a low priority PUSCH. Additionally, UCI of different priorities may be multiplexed on a single PUSCH. Thus, the high priority HARQ-ACK and low priority HARQ-ACK may be multiplexed on a low priority PUSCH or a high priority PUSCH.

Examples of payload reduction of low priority HARQ-ACK for UCI multiplexing are also described herein. In NR release 16, UCI multiplexing is supported only for UCIs with the same priority. In NR release 17, UCI multiplexing between different priorities, especially the multiplexing of HARQ-ACK with different priorities on a single UL channel (e.g., a PUCCH) will be supported.

The low priority HARQ-ACK for eMBB may have much larger payload compared with the high priority HARQ-ACK. This may be the case especially if code block group (CBG) transmission is configured on some serving cells for the eMBB services. On the other hand, the high priority HARQ-ACK codebook may support only TB-level HARQ-ACK.

In the case of HARQ-ACK multiplexing between different priorities, the total payload size may be much larger than the payload of the high priority HARQ-ACK. Similarly, when a low priority HARQ-ACK is multiplexed on a high priority PUSCH, the large payload of the low priority HARQ-ACK may occupy too many RE resources and degrade the high priority PUSCH performance, especially for the ultra-reliability requirements.

Thus, some examples for payload reduction of low priority HARQ-ACK are described herein. The payload reduction of HARQ-ACK bits may also be referred to as HARQ-ACK compression, HARQ-ACK bundling, payload compression, etc.

In one case, high priority HARQ-ACK and low priority HARQ-ACK may be reported together on a PUCCH. For UCI multiplexing of different priorities on PUCCH, the low priority HARQ-ACK payload reduction may be applicable for both joint coding and separate coding methods. In an example, payload reduction may be more important for joint coding because the joint HARQ-ACK bits are all treated with high priority and a low coding rate to provide the reliability requirements for the URLLC HARQ-ACK feedback. For separate coding, payload reduction can reduce the number of PRBs required on a PUCCH resource.

In another case, for UCI reporting on PUSCH, the low priority HARQ-ACK payload reduction may also be beneficial. For example, when the low priority HARQ-ACK is reported on a high priority PUSCH, reducing the low priority HARQ-ACK payload can reduce the impact on data performance on PUSCH.

Similarly, the same factors are applicable to the case of multiplexing high priority HARQ-ACK and low priority HARQ-ACK on a high priority PUSCH. For the case of multiplexing high priority HARQ-ACK and low priority HARQ-ACK on a low priority PUSCH, reducing the low priority HARQ-ACK may also reduce the total resource elements punctured or rate matched by the HARQ-ACK codebooks.

Examples of payload reduction methods with HARQ-ACK compression or bundling are also described herein. For HARQ-ACK up to 2 bits on PUCCH, especially for up to 2 bits of HARQ-ACK for both high priority HARQ-ACK and low priority HARQ-ACK, HARQ-ACK bundling may be used to reduce to one bit for HARQ-ACK multiplexing on a PUCCH format 0 or PUCCH format 1. Examples with a large payload low priority HARQ-ACK codebook, especially when Code Block Group (CBG) transmission is configured are described herein.

With regard to the CBG HARQ-ACK codebook, CBG transmission was introduced in NR to provide finer granularity for data transmission and data segment retransmission. The CBG granularity is configured by higher layer.

Examples of CBG-based HARQ-ACK codebook determination are described. If a UE is provided PDSCH-CodeBlockGroupTransmission for a serving cell, the UE may receive a PDSCH scheduled by DCI format 1_1 that includes code block groups (CBGs) of a transport block. The UE may also be provided maxCodeBlockGroupsPerTransportBlock indicating a maximum number $$N_{HARQ\text{-}ACK}^{CBG/TB,max}$$

of CBGs for generating respective HARQ-ACK information bits for a transport block reception for the serving cell.

For a number of C code blocks (CBs) in a transport block, the UE may determine a number of CBGs M and may determine a number of HARQ-ACK bits for the transport block as $$N_{HARQ\text{-}ACK}^{CBG/TB} = M.$$

The UE may generate an ACK for the HARQ-ACK information bit of a CBG if the UE correctly received all code blocks of the CBG and generates a NACK for the HARQ-ACK information bit of a CBG if the UE incorrectly received at least one code block of the CBG. If the UE receives two transport blocks, the UE may concatenate the HARQ-ACK information bits for CBGs of the second transport block after the HARQ-ACK information bits for CBGs of the first transport block.

The HARQ-ACK codebook may include the $$N_{HARQ\text{-}ACK}^{CBG/TB,max}$$

HARQ-ACK information bits and, if $$N_{HARQ\text{-}ACK}^{CBG/TB} < N_{HARQ\text{-}ACK}^{CBG/TB,max}$$

for a transport block, the UE may generate a NACK value for the last $$N_{HARQ\text{-}ACK}^{CBG/TB,max} - N_{HARQ\text{-}ACK}^{CBG/TB}$$

HARQ-ACK information bits for the transport block in the HARQ-ACK codebook.

If the UE generates a HARQ-ACK codebook in response to a retransmission of a transport block, corresponding to a same HARQ process as a previous transmission of the transport block, the UE may generate an ACK for each CBG that the UE correctly decoded in a previous transmission of the transport block.

If a UE correctly detects each of the $$N_{HARQ\text{-}ACK}^{CBG/TB}$$

CBGs and does not correctly detect HARQ-ACK the transport block for the $$N_{HARQ\text{-}ACK}^{CBG/TB}$$

CBGs, the UE may generate a NACK value for each of the $$N_{HARQ\text{-}ACK}^{CBG/TB}$$

CBGs.

If CBG is configured on a carrier or serving cell, CBG HARQ-ACK fallback to TB level HARQ-ACK is supported if a PDSCH that is scheduled by a DCI format 1_0, (e.g., a fallback DCI format). In this case, a HARQ-ACK bit may be generated at TB level. However, the number of HARQ-ACK bits in a HARQ-ACK report is not reduced. The TB level HARQ-ACK bit is repeated to fit the number of CBG bits configured for the UE. That is, the UE may repeat $$N_{HARQ\text{-}ACK}^{CBG/TB,max}$$

times the HARQ-ACK information for the HARQ-ACK transport block in the PDSCH or for the SPS PDSCH release.

In some examples, a HARQ-ACK codebook may be a semi-static type-1 HARQ-ACK codebook or a dynamic type-2 HARQ-ACK codebook, as discussed in detail herein.

Type 1 HARQ-ACK codebook, if the UE is configured with pdsch-HARQ-ACK-Codebook=semi-static, a Type-1 HARQ-ACK codebook is generated based on the set of values in the configured K1 set for HARQ-ACK timing indication. If CBG is configured for the UE, the UE may obtain a maximum number of CBGs $$N_{HARQ\text{-}ACK}^{CBG/TB,max}$$

based on the CBG configurations of serving cells, and the $$N_{HARQ\text{-}ACK}^{CBG/TB,max}$$

bits is generated for all potential PDSCH transmissions determined by the K1 set. If a UE receives a SPS PDSCH, or a SPS PDSCH release, or a PDSCH that is scheduled by a DCI format 1_0 and if the UE is configured with more than one serving cells, and PDSCH-CodeBlockGroupTransmission is provided to the UE, the UE repeats $$N_{HARQ\text{-}ACK}^{CBG/TB,max}$$

times the HARQ-ACK information for the transport block in the PDSCH or for the SPS PDSCH release.

Regarding the Type 2 HARQ-ACK codebook, if the UE is configured with pdsch-HARQ-ACK-Codebook=dynamic or with pdsch-HARQ-ACK-Codebook=enhancedDynamic-r16, a Type-2 HARQ-ACK codebook is generated by concatenating a TB level first HARQ-ACK sub-codebook and a CBG level second HARQ-ACK sub-codebook. A value of the counter downlink assignment indicator (DAI) field in DCI formats denotes the accumulative number of {serving cell, PDCCH monitoring occasion}-pair(s) in which PDSCH reception(s) or SPS PDSCH release associated with the DCI formats is present up to the current serving cell and current PDCCH monitoring occasion, first in ascending order of serving cell index and then in ascending order of PDCCH monitoring occasion index m, where $0 \le m < M$. The value of the total DAI, when present in a DCI format may denote the total number of {serving cell, PDCCH monitoring occasion}-pair(s) in which PDSCH reception(s) or SPS PDSCH release associated with DCI formats is present, up to the current PDCCH monitoring occasion m and is updated from PDCCH monitoring occasion to PDCCH monitoring occasion.

If a UE is provided PDSCH-CodeBlockGroupTransmission for $$N_{cells}^{DL,CBG}$$

serving cells; and is not provided PDSCH-CodeBlockGroupTransmission, for $$N_{cells}^{DL,CBG}$$

serving cells where $$N_{cells}^{DL,TB} + N_{cells}^{DL,CBG} = N_{cells}^{DL}.$$

The UE may determine the $$\delta_0^{ACK}, \delta_1^{ACK}, \ldots, \delta_{O^{ACK}-1}^{ACK}$$

of the Type 2 HARQ-ACK codebook by concatenating two sub-codebooks, one for TB based sub-codebook for cells that are not configured with CBG, and one for CBG based sub-codebook for cells that are not configured with CBG. In some examples, $$N_{cells}^{DL}$$

may be used for the determination of a first HARQ-ACK sub-codebook for the following: SPS PDSCH release; SPS PDSCH reception; DCI format 1_1 indicating SCell dormancy; and/or for TB-based PDSCH receptions on the $$N_{cells}^{DL,CBG}$$

serving cells and on the $$N_{cells}^{DL,TB}$$

serving cells. In some examples, $$N_{cells}^{DL}$$

may be replaced by $$N_{cells}^{DL,CBG}$$

for the determination of a second HARQ-ACK sub-codebook corresponding to the $$N_{cells}^{DL,CBG}$$

serving cells for CBG-based PDSCH receptions.

If, for an active DL BWP of a serving cell, the UE is not provided CORESETPoolIndex or is provided CORE-SETPoolIndex with value 0 for one or more first CORESETs and is provided CORESETPoolIndex with value 1 for one or more second CORESETs, and is provided ACKNACKFeedbackMode=JointFeedback, the serving cell is counted as two times where the first time corresponds to the first CORESETs and the second time corresponds to the second CORESETs. Instead of generating one HARQ-ACK information bit per transport block for a serving cell from the $$N_{cells}^{DL,CBG}$$

serving cells, the UE may generate $$N_{HARQ-ACK,max}^{CBG/TB,max}$$

HARQ-ACK information bits, where $$N_{HARQ-ACK,max}^{CBG/TB,max}$$

is the maximum value of $$N_{TB,c}^{DL} \cdot N_{HARQ-ACK,c}^{CBG/TB,max}$$

across all $$N_{cells}^{DL,CBG}$$

serving cells and $$N_{TB,c}^{DL}$$

is the value of maxNrofCodeWordsScheduledByDCI for serving cell c. If for a serving cell c it is $$N_{TB,c}^{DL} \cdot N_{HARQ-ACK,c}^{CBG/TB,max} < N_{HARQ-ACK,max}^{CBG/TB,max},$$

the UE may generate NACK for the last $$N_{HARQ-ACK,max}^{CBG/TB,max} - N_{TB,c}^{DL} \cdot N_{HARQ-ACK,c}^{CBG/TB,max}$$

HARQ-ACK information bits for serving cell c.

In some examples, the pseudo-code operation when harq-ACK-SpatialBundlingPUCCH is provided may not be applicable for CBG based HARQ-ACK sub-codebook generation. In some examples, the counter DAI value and the total DAI value may apply separately for each HARQ-ACK sub-codebook. In some examples, the UE may generate the HARQ-ACK codebook by appending the second HARQ-ACK sub-codebook to the first HARQ-ACK sub-codebook.

Examples of HARQ-ACK payload reduction are now described. At least for HARQ-ACK multiplexing with different priorities on PUCCH, payload reduction of low priority HARQ-ACK may be specified. The same methods may also be applied for payload reduction of low priority HARQ-ACK when it is reported on a high priority PUSCH or reported together with high priority HARQ-ACK on a PUSCH. The HARQ-ACK payload reduction can also be referred to as HARQ-ACK compression or HARQ-ACK bundling. The HARQ-ACK payload reduction may also include HARQ-ACK partial reporting or truncation.

Examples of different levels of HARQ-ACK payload reduction methods are described herein. A first level (Level 1) may include a CBG level HARQ-ACK compression/bundling with a target CBG configuration. In the case that HARQ-ACK with different priorities are multiplexed and reported on a PUCCH or a high priority PUSCH, if CBG is configured on some carriers, CBG level bundling may be supported for the low priority HARQ-ACK codebook to reduce the number of HARQ-ACK bits.

As a gradual compression method, a CBG level compression or bundling may be configured with a target number of bits by a smaller number of CBG. In some approaches, the number of CBG level HARQ-ACK bits is determined by the maximum number of CBGs $$N_{HARQ\text{-}ACK}^{CBG/TB,max}$$

of all cells configured with CBG.

In some examples, a separate number of CBGs may be configured $$N_{HARQ\text{-}ACK}^{CBG/TB,reduced}$$

to determine the number of compressed or reduced CBG bits for each TB. The value of $$N_{HARQ\text{-}ACK}^{CBG/TB,reduced}$$

may be smaller than $$N_{HARQ\text{-}ACK}^{CBG/TB,max}$$

and selected from the supported CBG values from the set of {2, 4, 6, 8}. For example, if $$N_{HARQ\text{-}ACK}^{CBG/TB,max}$$

is 8, and $$N_{HARQ\text{-}ACK}^{CBG/TB,reduced}$$

is 2, the number of CBG HARQ-ACK bits for each TB may be reduced from 8 bits to 2 bits.

Alternatively, in another approach, the target number of CBGs $$N_{HARQ\text{-}ACK}^{CBG/TB,reduced}$$

may be determined implicitly by the minimum number of CBGs $$N_{HARQ\text{-}ACK}^{CBG/TB,min}$$

for all CBG configured serving cells. For example, $$N_{HARQ\text{-}ACK}^{CBG/TB,reduced} = N_{HARQ\text{-}ACK}^{CBG/TB,min}.$$

For each TB, the uncompressed CBG level HARQ-ACK codebook may include the $$N_{HARQ\text{-}ACK}^{CBG/TB,max}$$

HARQ-ACK information bits and, if $$N_{HARQ\text{-}ACK}^{CBG/TB} < N_{HARQ\text{-}ACK}^{CBG/TB,max}$$

for a transport block, the UE may generate a NACK value for the last $$N_{HARQ\text{-}ACK}^{CBG/TB,max} - N_{HARQ\text{-}ACK}^{CBG/TB}$$

CBG level HARQ-ACK information bits for the transport block in the HARQ-ACK codebook.

In the case of CBG level HARQ-ACK compression or bundling, the $$N_{HARQ\text{-}ACK}^{CBG/TB}$$

CBG level HARQ-ACK may be used. The extra NACK value for the last $$N_{HARQ\text{-}ACK}^{CBG/TB_{max}} < N_{HARQ\text{-}ACK}^{CBG/TB}$$

CBG level HARQ-ACK information bits for the transport block may not be used during compressing or bundling.

If $$N_{HARQ\text{-}ACK}^{CBG/TB} < N_{HARQ\text{-}ACK}^{CBG/TB,reduced}$$

for a transport block, the UE may keep $$N_{HARQ\text{-}ACK}^{CBG/TB}$$

bit(s) and may generate a NACK value for the last $$N_{HARQ\text{-}ACK}^{CBG/TB,max} - N_{HARQ\text{-}ACK}^{CBG/TB}$$

reduced CBG level HARQ-ACK information bits for the transport block in the reduced CBG HARQ-ACK codebook. This is equivalent to removing the last $$N_{HARQ\text{-}ACK}^{CBG/TB,max} - N_{HARQ\text{-}ACK}^{CBG/TB}$$

NACK bits from the original CBG codebook of the given transport block.

If $$N_{HARQ\text{-}ACK}^{CBG/TB} > N_{HARQ\text{-}ACK}^{CBG/TB,reduced}$$

for a transport block, some bundling may be performed on the $$N_{HARQ\text{-}ACK}^{CBG/TB}$$

bits to $$N_{HARQ\text{-}ACK}^{CBG/TB,reduced}$$

reduced bits. If $$k = N_{HARQ\text{-}ACK}^{CBG/TB}/N_{HARQ\text{-}ACK}^{CBG/TB,reduced}$$

is an integer, then every k bits from $$N_{HARQ\text{-}ACK}^{CBG/TB}$$

bits is bundled into one reduced CBG HARQ-ACK bit. However, in several CBG configuration cases, $$N_{HARQ\text{-}ACK}^{CBG/TB}/N_{HARQ\text{-}ACK}^{CBG/TB,reduced}$$

is not an integer. For example, if $$N_{HARQ\text{-}ACK}^{CBG/TB} = 6 \text{ and } N_{HARQ\text{-}ACK}^{CBG/TB,reduced} = 4;$$

$$\text{or } N_{HARQ\text{-}ACK}^{CBG/TB} = 8 \text{ and } N_{HARQ\text{-}ACK}^{CBG/TB,reduced} = 6, \text{ then } N_{HARQ\text{-}ACK}^{CBG/TB}/N_{HARQ\text{-}ACK}^{CBG/TB,reduced}$$

is not an integer.

If $$N_{HARQ\text{-}ACK}^{CBG/TB} = 6 \text{ and } N_{HARQ\text{-}ACK}^{CBG/TB,reduced} = 4,$$

the 6-bit sequence {b0, b1, b2, b3, b4, b5} may be partial bundled into 4 bits (e.g., result in {b0, (b1 bundled with b2), b3, (b4 bundled with b5)} or {(b0 bundled with b1), b2, (b3 bundled with b4), b5}). If $$N_{HARQ\text{-}ACK}^{CBG/TB} = 8 \text{ and } N_{HARQ\text{-}ACK}^{CBG/TB,reduced} = 6,$$

the 8-bit sequence {b0, b1, b2, b3, b4, b5, b6, b7} may be partial bundled into 6 bits (e.g., result in {b0, b1, (b2 bundled with b3), b4, b5, (b6 bundled with b7)} or {(b0 bundled with b1), b2, b3, (b4 bundled with b5), b6, b7}).

For a type-1 HARQ-ACK codebook, if CBG is configured, $$N_{HARQ\text{-}ACK}^{CBG/TB,max}$$

bits of CBG level HARQ-ACK is generated for each TB. With CBG level HARQ-ACK bundling, $$N_{HARQ\text{-}ACK}^{CBG/TB,max}$$

bits of CBG level HARQ-ACK may be compressed into $$N_{HARQ\text{-}ACK}^{CBG/TB,reduced}$$

CBG level HARQ-ACK bits. Thus, the payload of low priority HARQ-ACK type-1 HARQ-ACK codebook may be compressed by a factor of $$N_{HARQ\text{-}ACK}^{CBG/TB,max}/N_{HARQ\text{-}ACK}^{CBG/TB,reduced}.$$

If $$N_{HARQ\text{-}ACK}^{CBG/TB,min}$$

is used as the target number of CBGs of each TB, the payload of low priority type-1 HARQ-ACK codebook may be compressed by a factor of $$N_{HARQ\text{-}ACK}^{CBG/TB,max}/N_{HARQ\text{-}ACK}^{CBG/TB,min}.$$

For a type-2 HARQ-ACK codebook, with CBG level bundling, the bundling may be applied to the CBG level second HARQ-ACK sub-codebook as described above. Thus, the CBG level second sub-codebook is bundled into a small CBG level second sub-codebook. Thus, the payload of low priority type-2 HARQ-ACK second sub-codebook may be compressed by a factor of $$N_{HARQ\text{-}ACK}^{CBG/TB,max}/N_{HARQ\text{-}ACK}^{CBG/TB,reduced}.$$

If $$N_{HARQ\text{-}ACK}^{CBG/TB,min}$$

is used as the target number of CBGs of each TB, the payload of low priority type-2 HARQ-ACK second sub-codebook may be compressed by a factor of $$N_{HARQ\text{-}ACK}^{CBG/TB,max}/N_{HARQ\text{-}ACK}^{CBG/TB,min}.$$

The UE may generate the new low priority HARQ-ACK codebook with payload reduction by appending the compressed CBG-level second HARQ-ACK sub-codebook to the first TB-level HARQ-ACK sub-codebook.

A second level (Level 2) may include CBG to transport block (TB) level HARQ-ACK compression/bundling. In the case that HARQ-ACK with different priorities are multiplexed and reported on a PUCCH or a high priority PUSCH, if CBG is configured on some carriers, CBG to TB level bundling may be supported for the low priority HARQ-ACK codebook. With CBG to TB bundling, the opposite of CBG HARQ-ACK generation may be performed such that all CBGs of a given TB are combined into a TB level HARQ-ACK bit. Also, a TB level HARQ-ACK may be reported without expansion to a maximum number of CBGs if CBG is configured for the serving cell.

Thus, if a UE correctly detects each of the $$N_{HARQ\text{-}ACK}^{CBG/TB}$$

CBGs and does not correctly detect the transport block for the $$N_{HARQ\text{-}ACK}^{CBG/TB}$$

CBGs, the UE may generate a NACK value for the each of the $$N_{HARQ\text{-}ACK}^{CBG/TB}$$

CBGs. This results in a NACK for the TB level HARQ-ACK. If a UE correctly detects each of the $$N_{HARQ\text{-}ACK}^{CBG/TB}$$

CBGs and correctly detect the transport block for the $$N_{HARQ\text{-}ACK}^{CBG/TB}$$

CBGs, the UE may generate an ACK value for the TB level HARQ-ACK. If a UE does not correctly detect at least one of the $$N_{HARQ\text{-}ACK}^{CBG/TB}$$

CBGs (e.g., there is at least one CBG is reported with NACK), then the HARQ-ACK UE may generate a NACK value for the TB level HARQ-ACK.

If the UE receives two transport blocks, the UE may bundle the CBG level HARQ-ACK into TB level HARQ-ACK for each TB, and then concatenates the HARQ-ACK information bits for the second transport block after the HARQ-ACK information bit for the first transport block.

The CBG level HARQ-ACK codebook may include the $$N_{HARQ\text{-}ACK}^{CBG/TB,max}$$

HARQ-ACK information bits and, if $$N_{HARQ\text{-}ACK}^{CBG/TB} < N_{HARQ\text{-}ACK}^{CBG/TB,max}$$

for a transport block, the UE may generate a NACK value for the last $$N_{HARQ\text{-}ACK}^{CBG/TB,max} - N_{HARQ\text{-}ACK}^{CBG/TB}$$

CBG level HARQ-ACK information bits for the transport block in the HARQ-ACK codebook. In the case of CBG to TB level HARQ-ACK bundling, the $$N_{HARQ\text{-}ACK}^{CBG/TB}$$

CBG level HARQ-ACK may be used. The extra NACK value for the last $$N_{HARQ\text{-}ACK}^{CBG/TB,max} - N_{HARQ\text{-}ACK}^{CBG/TB}$$

CBG level HARQ-ACK information bits for the transport block may not be used.

For a type-1 HARQ-ACK codebook, if CBG is configured, $$N_{HARQ\text{-}ACK}^{CBG/TB,max}$$

HARQ-ACK bits of CBG level HARQ-ACK is generated for each TB. With CBG to TB level HARQ-ACK bundling, $$N_{HARQ\text{-}ACK}^{CBG/TB,max}$$

bits of CBG level HARQ-ACK may be compressed into one TB level HARQ-ACK bit. Thus, the payload of low priority type-1 HARQ-ACK codebook may be CBG/TB,max compressed by a factor of $$N_{HARQ\text{-}ACK}^{CBG/TB,max}$$

For a type-2 HARQ-ACK codebook, with CBG to TB bundling, the opposite may be applied to the CBG level second HARQ-ACK sub-codebook as described above. Thus, the CBG level second sub-codebook is bundled into a TB-level second sub-codebook. Thus, the payload of low priority type-2 HARQ-ACK second sub-codebook may be compressed by a factor of $$N_{HARQ\text{-}ACK}^{CBG/TB,max}.$$

The UE may generate the new low priority HARQ-ACK codebook with payload reduction by appending the TB-level second HARQ-ACK sub-codebook to the first TB-level HARQ-ACK sub-codebook.

Therefore, if CBG is configured for HARQ-ACK codebook with priority index 0, the CBG to TB HARQ-ACK bundling may be an effective way to achieve a large payload reduction. Thus, the CBG to TB level HARQ-ACK reporting may be a default method for payload reduction if CBG is configured.

A third level (Level 3) may include spatial bundling between TBs in a PDSCH transmission. In this level of HARQ-ACK bundling, spatial bundling may be applied independently or jointly after CBG to TB level bundling.

A PDSCH transmission may include up to two transport blocks. If the UE is configured by maxNrofCode-WordsScheduledByDCI with reception of two transport blocks for the active DL BWP of serving cell c, 2 TB level HARQ-ACK information bits may be generated corresponding to a first transport block of this cell and a second transport block of the cell. If PDSCH-CodeBlockGroupTransmission is provided, and $$N_{HARQ\text{-}ACK,c}^{CBG/TB,max}$$

CBGs are indicated by maxCodeBlockGroupsPerTransport-Block for serving cell c, the UE may generate $$N_{HARQ\text{-}ACK,c}^{CBG/TB,max}$$

bits for each TB. If CBG is configured for the serving cell of the PDSCH transmission with two codeword, a $$N_{HARQ\text{-}ACK,c}^{CBG/TB,max}$$

number of bits may be generated for each codeword of the PDSCH transmission.

In an approach, if provided, spatial bundling is applicable only for TB level HARQ-ACK in a Type-1 HARQ-ACK codebook or a TB level first sub-codebook in a Type-2 HARQ-ACK codebook. In this approach, spatial bundling is not applicable for CBG level HARQ-ACK even when spatial bundling is provided.

For HARQ-ACK generation for a report on PUCCH, if harq-ACK-SpatialBundlingPUCCH is provided, and the UE is configured by maxNrofCodeWordsScheduledByDCI with reception of two transport blocks for the active DL BWP of serving cell c, one HARQ-ACK bit may be generated by a binary AND operation of the HARQ-ACK information bits corresponding to first and second transport blocks of this cell. If the UE receives one transport block, the UE may assume ACK for the second transport block.

For HARQ-ACK generation for a report on PUSCH, the UE may generate the HARQ-ACK codebook as described above except that harq-ACK-SpatialBundlingPUCCH is replaced by harq-ACK-SpatialBundlingPUSCH.

With payload reduction of low priority HARQ-ACK codebook. If provided, spatial bundling may also be applicable to a TB level HARQ-ACK codebook or sub-codebook obtain by CBG to TB bundling from a CBG based Type-1 HARQ-ACK codebook or the CBG based second HARQ-ACK sub-codebook in a Type-2 HARQ-ACK codebook.

Thus, spatial bundling may be performed after a CBG level HARQ-ACK codebook or a CBG level HARQ-ACK sub-codebook is bundled into a TB level HARQ-ACK codebook or a TB level HARQ-ACK sub-codebook. Thus, 2 TB level HARQ-ACK bits in a PDSCH may be bundled into 1 bit. If ACK is reported for both TBs, an ACK may be generated after spatial bundling. If there is a NACK in any of the TB level HARQ-ACK, a NACK may be generated after spatial bundling.

For HARQ-ACK multiplexing on PUCCH, the parameter of harq-ACK-SpatialBundlingPUCCH may be reused. Similarly, for HARQ-ACK multiplexing on PUSCH, harq-ACK-SpatialBundlingPUSCH may be reused for HARQ-ACK reporting on a PUCCH or a PUSCH respectively.

A fourth level (Level 4) may include HARQ-ACK grouping and bundling. HARQ-ACK grouping and HARQ-ACK bundling within each group may be used to reduce the HARQ-ACK payload of a low priority HARQ-ACK codebook. The HARQ-ACK bits may be grouped based on a group size, the HARQ-ACK bits in each group may be bundled into one bit by a binary AND operation.

The HARQ-ACK grouping size may be configured by higher layer signaling or a pre-defined default number may be specified in the standard. For example, the grouping size may be 2, 4, 6 or 8 bits.

Alternatively or additionally, a number of bundled low priority HARQ-ACK bits X may be configured by higher layer signaling, and the group size may be determined based on the number of bits in the low priority HARQ-ACK codebook N and the number of bundled low priority HARQ-ACK bits. Thus, the group size may be given by m=ceil(N/X), i.e.

$$m = \left\lceil \frac{N}{X} \right\rceil,$$

and the N low priority HARQ-ACK bits may be divided into X groups. Each group may include $$\left\lceil \frac{N}{X} \right\rceil \text{ or } \left\lfloor \frac{N}{X} \right\rfloor$$

uncompressed HARQ-ACK bits.

In one approach, each of the first X1=mod(N,X) groups may include $$m1 = \left\lceil \frac{N}{X} \right\rceil$$

uncompressed HARQ-ACK bits, and each of the last X2=X−mod(N,X) groups may include $$m2 = \left\lfloor \frac{N}{X} \right\rfloor$$

uncompressed HARQ-ACK bits. In yet another approach, each of the first $X1=X-mod(N,X)$ groups may include $$m1 = \left\lfloor \frac{N}{X} \right\rfloor$$

uncompressed HARQ-ACK bits, and each of the last $X2=mod(N,X)$ groups may include $$m2 = \left\lceil \frac{N}{X} \right\rceil$$

uncompressed HARQ-ACK bits.

Thus, if any HARQ-ACK in the group is a NACK, a NACK may be generated for the HARQ-ACK group. If all HARQ-ACK bits are ACK, an ACK may be generated for the HARQ-ACK group. If in a group of uncompressed HARQ-ACK bits, the number of remaining HARQ-ACK bit may be smaller than the group size. In this case, the HARQ-ACK group may be padded with ACK instead of NACK in the remaining bits to fit the group size for the purposed of bundling. In another approach, if the number of remaining HARQ-ACK bits are smaller than the group size, the remaining HARQ-ACK may be used for HARQ-ACK group bundling of the group.

In one approach, the HARQ-ACK grouping is applied on the original HARQ-ACK codebook. In case of CBG level HARQ-ACK codebook or sub-codebook, there is a NACK masking problem. With CBG level HARQ-ACK for TBs with padded NACK bits, i.e. if $$N_{HARQ\text{-}ACK}^{CBG/TB} < N_{HARQ\text{-}ACK}^{CBG/TB,max},$$

any HARQ-ACK bit grouped with a padded NACK bit will be lost with bundling.

To overcome this issue, one more step may be performed on the original CBG codebook or sub-codebook. For each transport block, the additional NACK bits padded to the CBG HARQ-ACK information may be replaced with ACK before HARQ-ACK grouping and bundling. Thus, the HARQ-ACK codebook or sub-codebook may include the $$N_{HARQ\text{-}ACK}^{CBG/TB,max}.$$

HARQ-ACK information bits and, if $$N_{HARQ\text{-}ACK}^{CBG/TB} < N_{HARQ\text{-}ACK}^{CBG/TB,max}$$

for a transport block, the UE may replace the NACK with an ACK value for the last $$N_{HARQ\text{-}ACK}^{CBG/TB,max} - N_{HARQ\text{-}ACK}^{CBG/TB,}$$

HARQ-ACK information bits for the transport block in the HARQ-ACK codebook or sub-codebook before the HARQ-ACK grouping and bundling. The HARQ-ACK group bundling is then performed on the modified CBG based HARQ-ACK codebook or sub-codebook.

In another approach, the HARQ-ACK grouping and bundling may be applied on a TB-level HARQ-ACK codebook. If CBG is configured, the CBG to TB level HARQ-ACK may be performed first on the CBG level HARQ-ACK codebook or sub-codebook.

In one implementation, the HARQ-ACK grouping and bundling may be performed on the resulting TB level HARQ-ACK codebook after CBG to TB HARQ-ACK bundling. In another implementation, if configured, spatial bundling may be further applied on the resulting TB level HARQ-ACK codebook. This provides more aggressive payload reduction. Thus, HARQ-ACK grouping and bundling may be applied between PDSCH transmissions after the above levels of payload reduction. The TB-level HARQ-ACK bits may be grouped based on a group size. The HARQ-ACK bits in each group may be bundled into one bit by a binary AND operation. Thus, if any HARQ-ACK in the group is a NACK, a NACK may be generated for the HARQ-ACK group. If all HARQ-ACK bits are ACK, an ACK may be generated for the HARQ-ACK group. If the number of remaining HARQ-ACK bit is smaller than the group size, the HARQ-ACK group may be padded with ACK instead of NACK in the remaining bits to fit the group size. In another implementation, if the number of remaining HARQ-ACK bits is smaller than the group size, the remaining HARQ-ACK may be used for HARQ-ACK group bundling of the group.

For both approaches above, the HARQ-ACK grouping and bundling may be applied to dynamic HARQ-ACK codebook, i.e. type 2 HARQ-ACK codebook. In type-2 HARQ-ACK codebook, the DL transmissions are indicated by the counter DAI and total DAI. The number of HARQ-ACK reports correspond to the indicated DAI values.

For both approaches above, in a semi-static HARQ-ACK codebook, i.e. type 1 HARQ-ACK codebook, the HARQ-ACK bits for all potential PDSCH transmissions may be based on the reporting window, and NACK may be reported for a potential PDSCH that does not transmit. Thus, any HARQ-ACK bit for a received PDSCH grouped with a padded NACK bit will be lost with bundling. This is similar to the masking problem of CBG bundling with padded NACK.

To overcome this NACK masking issue for type-1 codebook, one more step may be performed on the original type-1 codebook. For each potential DL transmission that does not occur, the additional NACK bits padded to the type-1 HARQ-ACK information may be replaced with ACK before HARQ-ACK grouping and bundling. This principle applies to both CBG based and TB based HARQ-ACK codebook. For CBG based type-1 codebook, if $$N_{HARQ\text{-}ACK}^{CBG/TB} < N_{HARQ\text{-}ACK}^{CBG/TB,max}$$

for a transport block for a transport block of a DL transmission, the additional NACK bits padded to the CBG HARQ-ACK information of the transport block may be replaced with ACK before HARQ-ACK grouping and bundling. However, the replacement of NACK to ACK for slots with non-detected PDSCH transmission may introduce a DTX-to-ACK error if the UE mis-detects the PDSCH in a scheduled transmission. Alternatively, the grouping and bundling may be applied on type-2 codebook, and not for a type-1 codebook.

Examples of conditions and signaling for HARQ-ACK payload reduction on PUCCH are now described. The HARQ-ACK multiplexing with different priorities on PUCCH may be supported at least by higher layer signaling, i.e. configured by RRC signaling. Similarly, for HARQ-ACK multiplexing with different priorities on PUCCH, the payload reduction for low priority HARQ-ACK codebook may be configured by higher layer signaling.

The PUCCH resources may be configured for HARQ-ACK with a priority index with a maximum payload for each set of PUCCH resources. The payload reduction of the low priority HARQ-ACK may reduce the probability of payload overflow. Also, with payload reduction, the UE may use a PUCCH resource with lower payload and less PRB allocation, thus reducing the PUCCH resource utilization.

Payload reduction parameters for PUCCH are also described. An RRC parameter (e.g., harq-ACK-CBGBundlingPUCCH) may be specified to support CBG level HARQ-ACK compression or bundling. If harq-ACK-CBGBundlingPUCCH is enabled, a UE may perform CBG level HARQ-ACK compression as given above to generate a compressed low priority HARQ-ACK codebook.

In one approach, a separate parameter (e.g., CBGReducedPUCCH) may configure the number of compressed or reduced CBG bits for each TB, i.e.

$$N_{HARQ\text{-}ACK}^{CBG/TB,reduced}.$$

The value of CBGReducedPUCCH may be smaller than maximum number of CBG configure for the serving cells and may be selected from the supported CBG values from the set of {2, 4, 6, 8}. In another approach, CBGReducedPUCCH may be determined implicitly by the minimum number of CBGs $$N_{HARQ\text{-}ACK}^{CBG/TB,min}$$

for all CBG configured serving cells (i.e., $$N_{HARQ\text{-}ACK}^{CBG/TB,reduced} = N_{HARQ\text{-}ACK}^{CBG/TB,min}).$$

An RRC parameter (e.g., harq-ACK-CBGtoTBBundling-PUCCH) may be specified to support CBG to TB level HARQ-ACK compression or bundling. If harq-ACK-CBG-toTBBundlingPUCCH is enabled, a UE may perform CBG to TB level HARQ-ACK compression as given above to generate a compressed low priority HARQ-ACK codebook.

The spatial bundling, if configured, may be further considered on TB level HARQ-ACK generated from CBG HARQ-ACK codebook with harq-ACK-CBGtoTB-BundlingPUCCH. In one approach, even if harq-ACK-SpatialBundlingPUCCH is configured for the low priority HARQ-ACK codebook, spatial bundling is not performed on the TB level HARQ-ACK generated from CBG HARQ-ACK codebook with harq-ACK-CBGtoTBBundling-PUCCH.

In another approach, if harq-ACK-CBGtoTBBundling-PUCCH is enabled, and if harq-ACK-SpatialBundling- PUCCH is configured for the low priority HARQ-ACK codebook, spatial bundling may be performed after a CBG level HARQ-ACK codebook or sub-codebook is bundled into a TB level HARQ-ACK codebook or sub-codebook. Thus, 2 TB level HARQ-ACK bits in a PDSCH may be bundled into 1 bit. If ACK is reported for both TBs, an ACK may be generated after spatial bundling. If there is a NACK in any of the TB level HARQ-ACK, a NACK may be generated after spatial bundling.

Another RRC parameter (e.g., harq-ACK-Group-BundlingPUCCH) may be specified to support group-based HARQ-ACK bundling. In one implementation, if harq-ACK-CBGBundlingPUCCH is not enabled, and if harq-ACK-GroupBundlingPUCCH is enabled, a UE may perform HARQ-ACK grouping and HARQ-ACK bundling within each group on the original low priority HARQ-ACK codebook, as described above.

In another implementation, if harq-ACK-CBGBundling-PUCCH is enabled, and if harq-ACK-GroupBundling-PUCCH is enabled, a UE may perform CBG to TB level HARQ-ACK bundling first. The group bundling may then be applied on the TB level HARQ-ACK codebook. Additional spatial bundling may be applied if configured on the TB level HARQ-ACK codebook.

The HARQ-ACK grouping size may be configured by higher layer signaling (e.g., by a new parameter of harq-ACK-GroupBundlingSizePUCCH) or a pre-defined number may be specified in the standard. For example, the grouping size may be 2, 4 or 8 bits.

Alternatively, or additionally, a number of bundled low priority HARQ-ACK bits X for PUCCH may be configured by higher layer signaling. The group size may be determined based on the number of bits in the low priority HARQ-ACK codebook N and the number of bundled low priority HARQ-ACK bits X. Thus, the group size may be given by m=ceil(N/X), i.e.

$$m = \left\lceil \frac{N}{X} \right\rceil.$$

The UE may perform the HARQ-ACK grouping and bundling based on the detailed method as described above.

The parameter harq-ACK-GroupBundlingPUCCH for group based HARQ-ACK bundling may be configured for all types of HARQ-ACK codebooks. The parameter harq-ACK-GroupBundlingPUCCH for group based HARQ-ACK bundling may be configured for type-2 HARQ-ACK codebook, and may not be applicable for a type-1 HARQ-ACK codebook.

In another method, a parameter harq-ACK-Bundling-PUCCH may be configured. The value of the parameter may be selected from CBGBundlingPUCCH, CBGtoTB-BundlingPUCCH, GroupBundlingPUCCH, etc., to indicate different HARQ-ACK payload reduction methods. In yet another method, one HARQ-ACK bundling method (e.g., the CBG to TB bundling) may be defined as the default method unless another method is configured explicitly by higher layer signaling.

Examples of conditions to apply payload reduction on PUCCH are now discussed. For multiplexing of HARQ-ACK with different priorities on PUCCH, several methods may be implemented on the conditions to apply the configured payload reduction scheme if the HARQ-ACK payload reduction is configured.

In one method, the HARQ-ACK payloads without payload reduction are evaluated first. If there is a PUCCH resource that can carry all HARQ-ACK bits, payload reduction is not applied even if a payload reduction scheme is configured and enabled. On the other hand, if there is no PUCCH resource that can carry the combined HARQ-ACK bits, the payload reduction for low priority HARQ-ACK may be applied. Then HARQ-ACK multiplexing on PUCCH may be re-evaluated with the high priority HARQ-ACK codebook and the payload reduced low priority HARQ-ACK codebook.

In one implementation, a single payload reduction method is configured, and the payload reduction is performed once based on the configured payload reduction method. Then HARQ-ACK multiplexing on PUCCH is re-evaluated only once with the high priority HARQ-ACK codebook and the payload reduced low priority HARQ-ACK codebook.

In another implementation, or additionally, multiple HARQ-ACK payload reduction methods may be configured, and the least aggressive payload reduction method is tested and the resulting reduced HARQ-ACK codebook is evaluated to check whether the PUCCH can carry the multiplexed HARQ-ACK bits. If there is still no PUCCH resource that can carry the multiplexed HARQ-ACK, the next payload reduction method may be evaluated. Thus, eventually, the least aggressive payload reduction method that can satisfy the PUCCH resource capacity is used.

In another method, if payload reduction harq-ACK-BundlingPUCCH is configured and enabled, payload reduction may always be applied on the low priority HARQ-ACK codebook in the case of multiplexing with high priority HARQ-ACK on a single PUCCH. The HARQ-ACK multiplexing may be performed with the high priority HARQ-ACK codebook and the payload reduced low priority HARQ-ACK codebook. The multiplexed HARQ-ACK bits may be transmitted on a high priority PUCCH resource. A HARQ-ACK payload reduction method may be configured as described above, or a reduced number of HARQ-ACK bits X may be configured for HARQ-ACK grouping.

In yet another method, a payload threshold may be configured. The payload reduction may be performed if the payload threshold is exceeded. In some examples, the payload threshold may be configured based on the number of HARQ-ACK bits with priority index 0. In some examples, the payload threshold may be configured based on the total number of HARQ-ACK bits with priority index 1 and priority 0.

In yet another method, whether to apply payload reduction may be determined by the UCI coding methods. If joint coding is used for HARQ-ACK with different priorities, the payload reduction may be applied on the low priority HARQ-ACK codebook. If separate coding is used for HARQ-ACK with different priorities, the payload reduction may not be applied on the low priority HARQ-ACK codebook.

In yet another method, the payload threshold and coding methods may be applied jointly to determine if payload reduction may be performed on the low priority HARQ-ACK codebook. For example, if joint coding is applied and the total payload is above a first payload threshold, the payload reduction may be applied with the configured HARQ-ACK bundling method. If separate coding is applied and the payload of low priority HARQ-ACK is above a second payload threshold, the payload reduction is applied with the configured HARQ-ACK bundling method on the low priority HARQ-ACK codebook.

If payload reduction on low priority HARQ-ACK is applied, and if the multiplexed high priority HARQ-ACK and the payload reduced low priority HARQ-ACK still cannot be reported on a configured high priority PUCCH resource, then in one approach, the low priority HARQ-ACK may be dropped. In another approach, the payload reduced low priority HARQ-ACK may be partially dropped so that the number of remaining HARQ-ACK bits is up to the PUCCH capacity.

Configurations and use cases for HARQ-ACK payload reduction on PUSCH For HARQ-ACK multiplexing on PUSCH, the payload reduction method for low priority HARQ-ACK codebook may be configured by higher layer signaling independently from payload reduction configuration for HARQ-ACK reporting on PUCCH.

Examples of payload reduction parameters for PUSCH are also described. A RRC parameter (e.g., harq-ACK-CBGBundlingPUSCH) may be specified to support CBG level HARQ-ACK compression or bundling. If harq-ACK-CBGBundlingPUSCH is enabled, a UE may perform CBG level HARQ-ACK compression as given above to generate a compressed low priority HARQ-ACK codebook.

In one approach, a separate parameter (e.g., CBGReducedPUSCH) may configure the number of compressed or reduced CBG bits for each TB, i.e.

$$N_{HARQ\text{-}ACK}^{CBG/TB,reduced}.$$

The value of CBGReducedPUSCH may be smaller than the maximum number of CBG configured for the serving cells and may be selected from the supported CBG values from the set of {2, 4, 6, 8}. In another approach, CBGReducedPUSCH may be determined implicitly by the minimum number of CBGs $$N_{HARQ\text{-}ACK}^{CBG/TB,min}$$

for all CBG configured HARQ-ACK serving cells, i.e.

$$N_{HARQ\text{-}ACK}^{CBG/TB,reduced} = N_{HARQ\text{-}ACK}^{CBG/TB,min}.$$

A RRC parameter (e.g., harq-ACK-CBGtoTBBundlingPUSCH) may be specified to support CBG to TB level HARQ-ACK compression or bundling. If harq-ACK-CBGtoTBBundlingPUCCH is enabled, a UE may perform CBG to TB level HARQ-ACK compression as given above to generate a compressed low priority HARQ-ACK codebook.

The spatial bundling, if configured, may be further considered on TB level HARQ-ACK generated from CBG HARQ-ACK codebook with harq-ACK-CBGtoTB-BundlingPUSCH. In one approach, even if harq-ACK-SpatialBundlingPUSCH is configured for the low priority HARQ-ACK codebook, spatial bundling is not performed on the TB level HARQ-ACK generated from CBG HARQ-ACK codebook with harq-ACK-CBGtoTBBundlingPUSCH. In another approach, if harq-ACK-CBGtoTB-BundlingPUSCH is enabled, and if harq-ACK-SpatialBundlingPUSCH is configured for the low priority HARQ-ACK codebook, spatial bundling may be performed after a CBG level HARQ-ACK codebook or sub-codebook is bundled into a TB level HARQ-ACK codebook or sub-codebook. Thus, 2 TB level HARQ-ACK bits in a PDSCH may be bundled into 1 bit. If ACK is reported for both TBs, an ACK may be generated after spatial bundling. If there is a NACK in any of the TB level HARQ-ACK, a NACK may be generated after spatial bundling.

Another RRC parameter (e.g., harq-ACK-Group-BundlingPUSCH) may be specified to support group based HARQ-ACK bundling. In one case, if harq-ACK-CBGBundlingPUSCH is not enabled, and if harq-ACK-GroupBundlingPUSCH is enabled, a UE may perform HARQ-ACK grouping and HARQ-ACK bundling within each group on the original low priority HARQ-ACK codebook, as described above. In another case, if harq-ACK-CBGBundlingPUSCH is enabled, and if harq-ACK-Group-BundlingPUSCH is enabled, a UE may perform CBG to TB level HARQ-ACK bundling first. The group bundling may then be applied on the TB level HARQ-ACK codebook.

The HARQ-ACK grouping size may be configured by higher layer signaling or a pre-defined number may be specified in the standard. For example, the grouping size may be 2, 4 or 8 bits. For example, the HARQ-ACK grouping size may be configured by a new parameter of harq-ACK-GroupBundlingSizePUSCH.

Alternatively, or additionally, a number of bundled low priority HARQ-ACK bits X for PUSCH may be configured by higher layer signaling. The group size may be determined based on the number of bits in the low priority HARQ-ACK codebook N and the number of bundled low priority HARQ-ACK bits. Thus, the group size may be given by m=ceil(N/X), i.e.

$$m = \left\lceil \frac{N}{X} \right\rceil.$$

The UE may then perform the HARQ-ACK grouping and bundling based on the detailed method as described above.

In some examples, the parameter harq-ACK-Group-BundlingPUSCH for group based HARQ-ACK bundling may be configured for all types of HARQ-ACK codebooks. In some examples, the parameter harq-ACK-Group-BundlingPSCCH for group based HARQ-ACK bundling may be configured for type-2 HARQ-ACK codebook, and may not be applicable for a type-1 HARQ-ACK codebook.

In another method, a parameter harq-ACK-Bundling-PUSCH may be configured. The value of the parameter may be selected from CBGBundlingPUSCH, CBGtoTB-BundlingPUSCH, GroupBundlingPUSCH, etc. to indicate different HARQ-ACK payload reduction methods.

In yet another method, one HARQ-ACK bundling method (e.g., the CBG to TB bundling) may be defined as the default method unless another method is configured explicitly by higher layer signaling.

Examples of payload reduction configurations on different PUSCH multiplexing use cases are now described. In NR Rel-16, UCI multiplexing on PUSCH is supported only for UCI and PUSCH with the same priority. In Rel-17, for HARQ-ACK multiplexing on PUSCH, three new cases will be supported considering UCI of different priorities and channels with different priorities, including Case 1: low priority HARQ-ACK on high priority PUSCH; Case 2: high priority HARQ-ACK and low priority HARQ-ACK on high priority PUSCH; and Case 3: high priority HARQ-ACK and low priority HARQ-ACK on low priority PUSCH.

To support different cases of HARQ-ACK multiplexing on PUSCH, different beta offset values may be applied for HARQ-ACK with different priorities. The high priority HARQ-ACK may be applied with a higher beta offset than that of the low priority HARQ-ACK. Similarly, for the HARQ-ACK with a given priority, different beta offset values may be configured for multiplexing on PUSCH with different priorities.

PUCCH resources are configured by higher layer signaling. If the PUCCH cannot carry the HARQ-ACK codebook with different priorities, the low priority HARQ-ACK may be dropped. Compared with PUCCH, a PUSCH resource allocation may be more flexible.

A low priority PUSCH for eMBB service may have a large PRB allocation. On the other hand, a high priority PUSCH for URLLC service may have a limited number of PRBs for small critical data, or URLLC may have a larger PRB allocation to provide ultra-reliability compared with eMBB. With HARQ procedures, a PUSCH may be re-transmitted if it is not correctly received. Moreover, repetition may be configured for a PUSCH transmission.

For UCI multiplexing on PUSCH, different beta offset values can be applied for HARQ-ACK bits with different priorities. Thus, the impact of low priority HARQ-ACK on a PUSCH may be different based on the priority of the PUSCH and the size of PUSCH resource allocation.

Examples for how to apply a payload reduction scheme for low priority HARQ-ACK codebook for different use cases are described. In one method, the payload reduction method and parameters may be applied only when multiplexing of HARQ-ACK with different priorities on a single PUSCH. In some examples, this includes high priority HARQ-ACK and low priority HARQ-ACK on high priority PUSCH. In some examples, this includes high priority HARQ-ACK and low priority HARQ-ACK on low priority PUSCH.

In another method, the payload reduction method and parameters can be applied only when the low priority HARQ-ACK is reported on a high priority PUSCH. Thus, the payload reduction method and parameters may apply to low priority HARQ-ACK on high priority PUSCH; and/or high priority HARQ-ACK and low priority HARQ-ACK on high priority PUSCH.

In another method, the payload reduction method and parameters may be applied for all three cases (i.e., Case 1, Case 2, and Case 3).

In yet another method, the payload reduction methods and parameters may be configured independently for each use case. For example, payload reduction may be configured for one use case, but not for another use case. The same or different payload reduction methods or levels may be configured separately for different use cases. For example, for low priority HARQ-ACK with or without high priority HARQ-ACK on high priority PUSCH, a more aggressive HARQ-ACK bundling may configured than the HARQ-ACK bundling method for low priority HARQ-ACK with or without high priority HARQ-ACK on high priority PUSCH.

Additionally, or alternatively, for a use case that supports low priority HARQ-ACK payload reduction, a payload threshold may be configured to determine if payload reduction is applied. For example, the payload reduction may be performed only if the payload threshold is exceeded. In some examples, the payload threshold may be configured based on the number of HARQ-ACK bits with priority index 0. In some examples, the payload threshold may be configured based on the total number of HARQ-ACK bits with priority index 1 and priority 0 in case of HARQ-ACK multiplexing with different priorities on PUSCH.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

The gNB operations module 182 may provide information 190 to the one or more receivers 178. For example, the gNB operations module 182 may inform the receiver(s) 178 when to receive transmissions.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
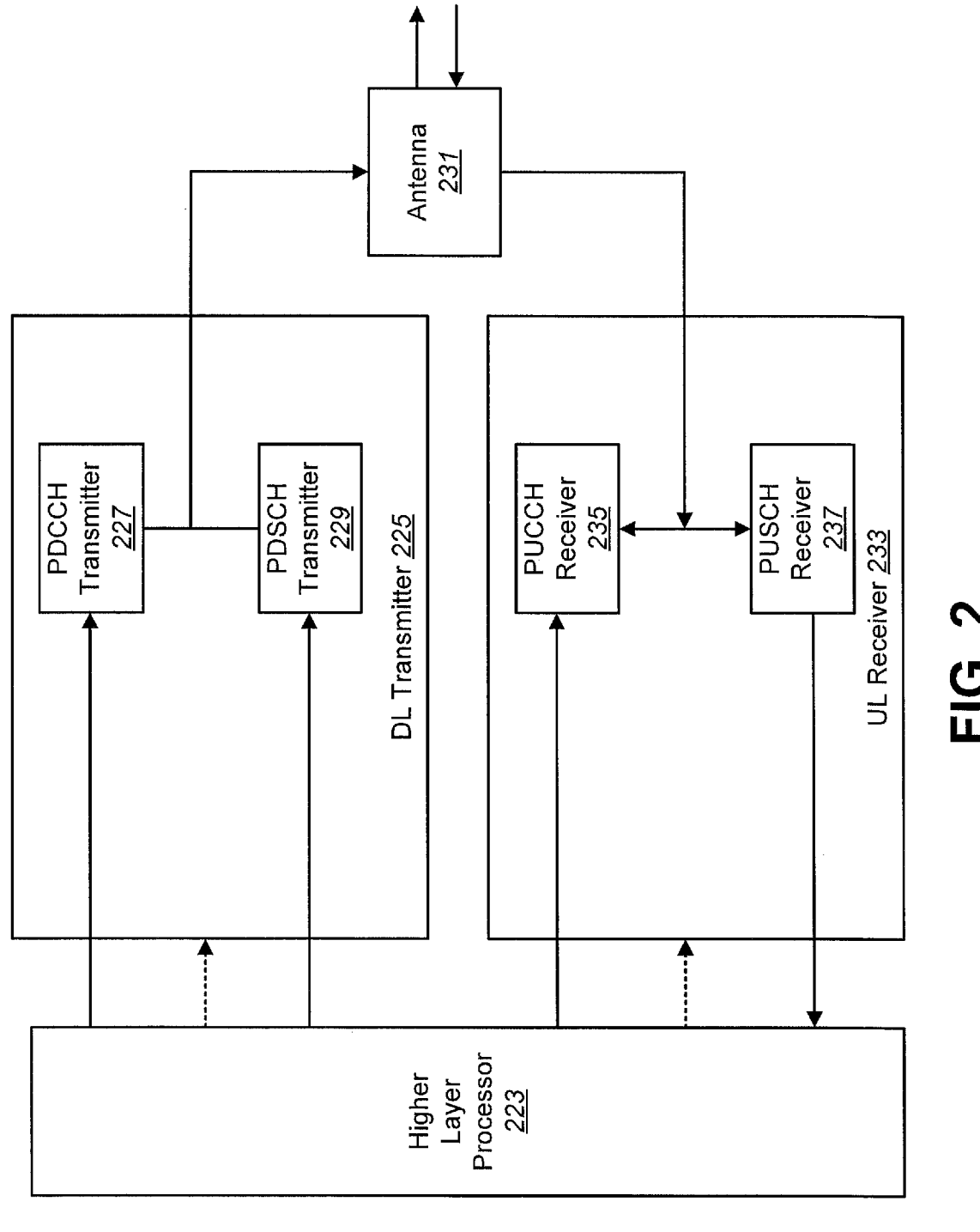
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
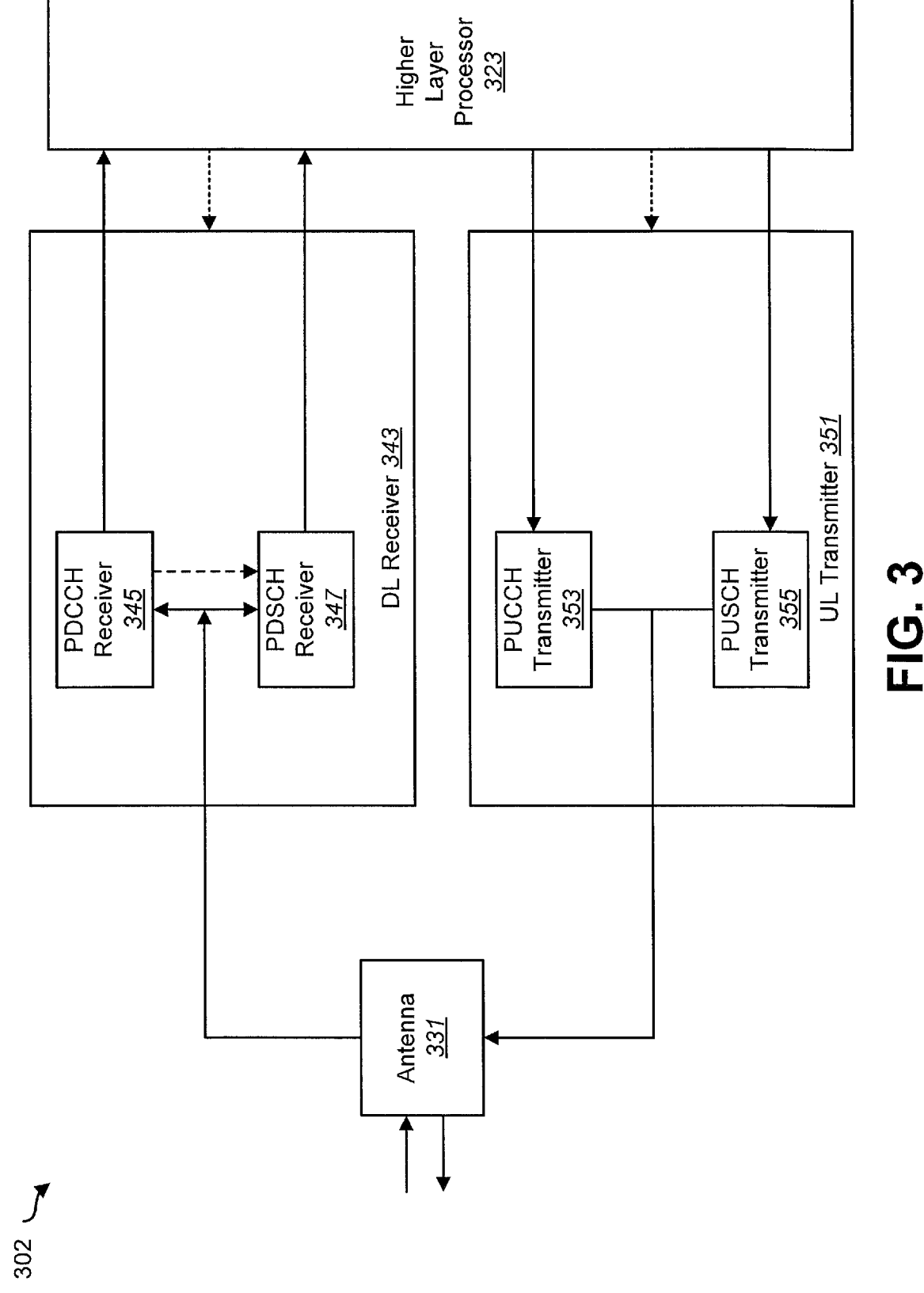
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323

DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
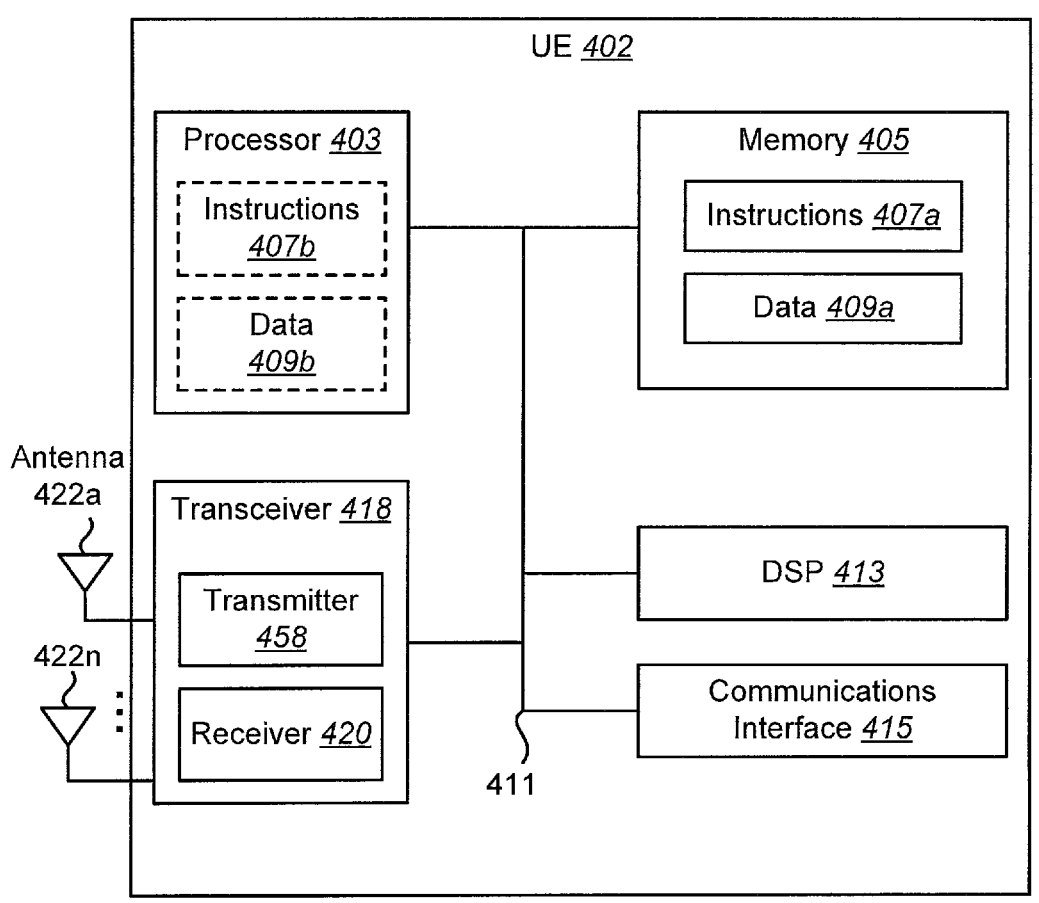
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407a and data 409a to the processor 403. A portion of the memory 405 may also include non-volatile random-access memory (NVRAM). Instructions 407b and data 409b may also reside in the processor 403. Instructions 407b and/or data 409b loaded into the processor 403 may also include instructions 407a and/or data 409a from memory 405 that were loaded for execution or processing by the processor 403. The instructions 407b may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422a-n are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
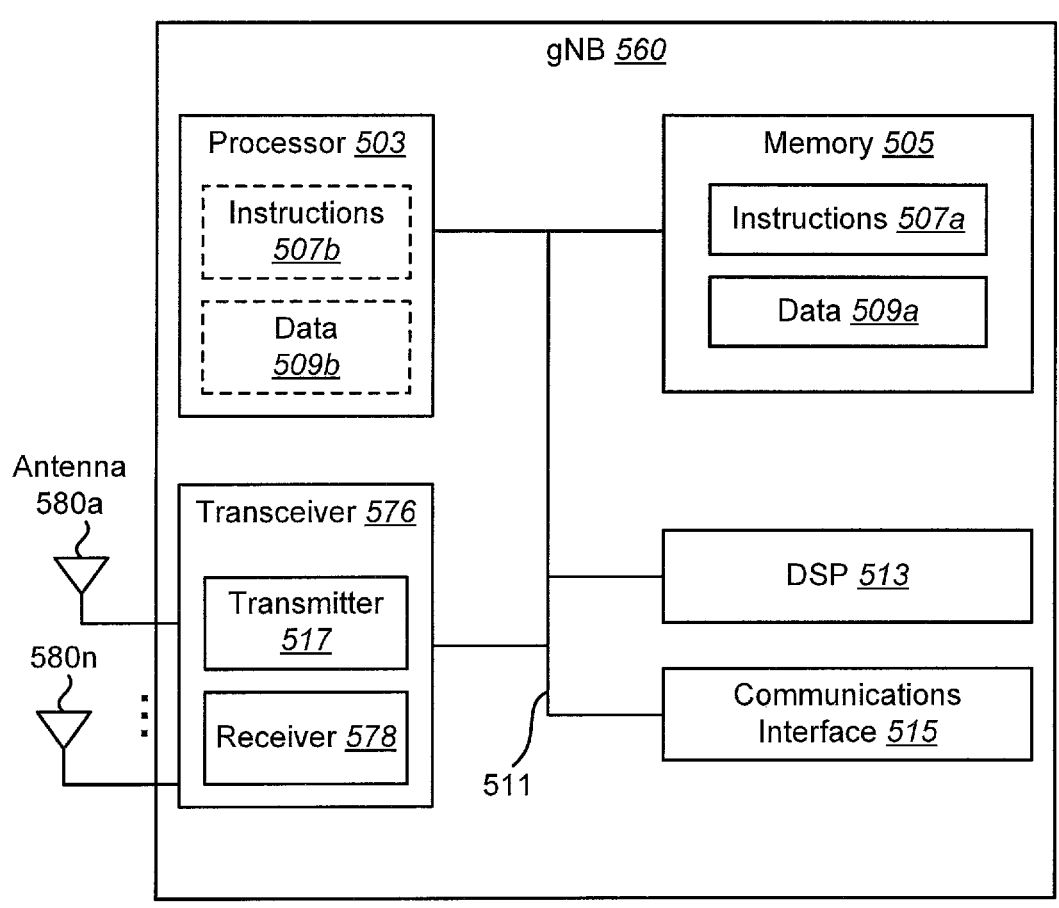
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507a and data 509a to the processor 503. A portion of the memory 505 may also include non-volatile random-access memory (NVRAM). Instructions 507b and data 509b may also reside in the processor 503. Instructions 507b and/or data 509b loaded into the processor 503 may also include instructions 507a and/or data 509a from memory 505 that were loaded for execution or processing by the processor 503. The instructions 507b may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
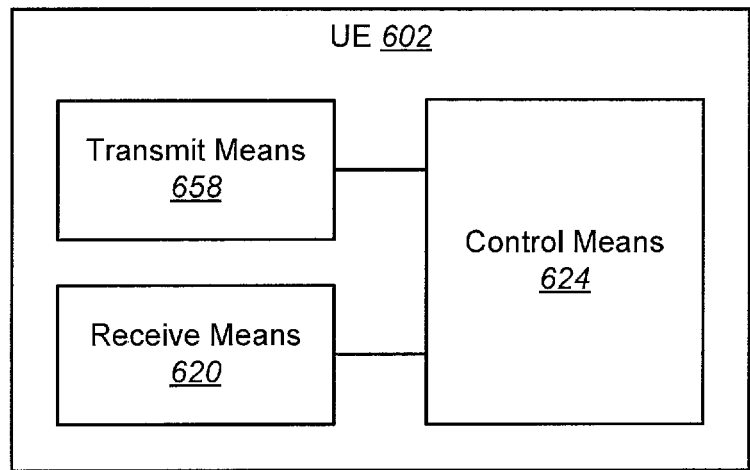
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
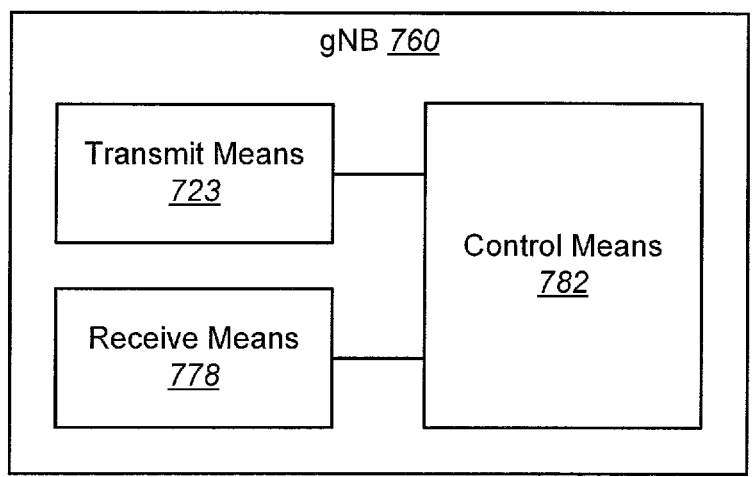
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

Figure 8:
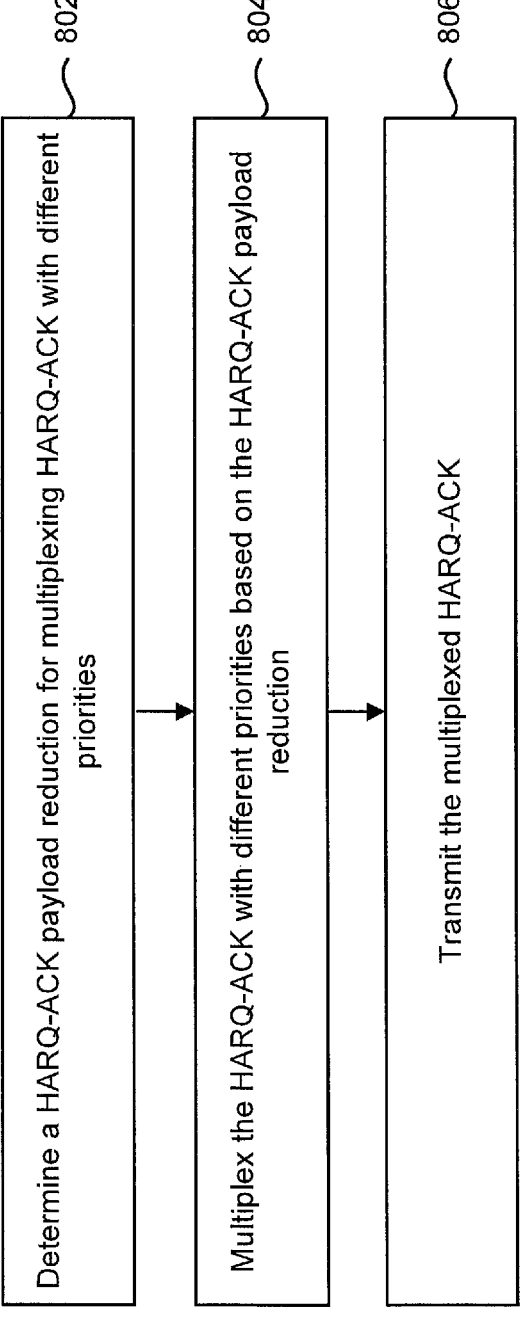
FIG. 8 is a flow diagram illustrating a method by a UE for code rate determination for payload reduction of multiplexed HARQ-ACK with different priorities.

FIG. 8 is a flow diagram illustrating a method 800 by a UE 102 for payload reduction of multiplexed hybrid automatic repeat request-acknowledgement (HARQ-ACK) with different priorities. The UE 102 may determine 802 determine a HARQ-ACK payload reduction for multiplexing HARQ-ACK with different priorities. The UE 102 may multiplex 804 multiplex the HARQ-ACK with different priorities based on the HARQ-ACK payload reduction. The UE 102 may transmit 806 the multiplexed HARQ-ACK.

When HARQ-ACK with priority index 0 is reported together with HARQ-ACK with priority index 1 on a PUCCH or PUSCH or is reported on a PUSCH with priority index 1, different HARQ-ACK payload reduction methods can be specified to reduce the number of HARQ-ACK bits with priority index 0.

In some examples, determining the HARQ-ACK payload reduction may include code block group (CBG) level HARQ-ACK compression or bundling with a target CBG configuration. A first level (Level 1), may include CBG level HARQ-ACK compression/bundling with a target CBG configuration. For example, a target number of CBG can be configured or determined by the minimum number of CBG. The CBG bits of a TB may be re-grouped based on the target number of CBG to generate the HARQ-ACK bits.

In some examples, determining the HARQ-ACK payload reduction may include CBG to transport block (TB) level HARQ-ACK compression or bundling. A second level (Level 2) may include CBG to TB level HARQ-ACK compression/bundling. The CBG HARQ-ACK bit of a TB may be bundled into one bit of TB level HARQ-ACK. For both Level 1 and Level 2, any additional NACK bits (if present) may be padded to the CBG HARQ-ACK information for a TB that is not to be used in bundling.

In some examples, determining the HARQ-ACK payload reduction may include spatial bundling between TBs in a physical downlink shared channel (PDSCH) transmission. A third level (Level 3) may include spatial bundling between TBs in a PDSCH transmission. In some approaches, if provided, spatial bundling is applicable only for TB level HARQ-ACK in a Type-1 HARQ-ACK codebook or a TB level first sub-codebook in a Type-2 HARQ-ACK codebook. Spatial bundling is not applicable for CBG level HARQ-ACK even when spatial bundling is provided. With payload reduction of low priority HARQ-ACK codebook, if provided, spatial bundling may also be applicable to a TB level HARQ-ACK codebook or sub-codebook obtain by CBG to TB bundling from a CBG based Type-1 HARQ-ACK codebook or the CBG based second HARQ-ACK sub-codebook in a Type-2 HARQ-ACK codebook.

In some examples, determining the HARQ-ACK payload reduction comprises grouping HARQ-ACK bits based on a group size. A fourth level (Level 4) may include HARQ-ACK grouping and bundling. The HARQ-ACK bits may be grouped based on a group size, the HARQ-ACK bits in each group is bundled into one bit by a binary AND operation. In some examples, the group size may be configured by higher layer signaling. In some examples, the group size may be determined by the number of HARQ-ACK bits N and a number of bundled HARQ-ACK bits X configured by higher layer signaling.

In a first approach (Approach 1), grouping and bundling on the low priority HARQ-ACK codebook may be performed directly. To overcome a padding NACK masking problem, any additional NACK bits padded to the CBG HARQ-ACK information in a TB may be replaced with ACK before HARQ-ACK grouping and bundling.

In a second approach (Approach 2), grouping may be performed only on TB level HARQ-ACK codebook. In the case of CBG level HARQ-ACK, CBG to TB level HARQ-ACK bundling may be performed first.

For both approaches, additional handling may be performed on a type-1 HARQ-ACK codebook. To overcome the padding NACK masking problem, any additional NACK bits padded to type-1 HARQ-ACK codebook may be replaced with ACK before HARQ-ACK grouping and bundling. Alternatively, the grouping and bundling may be applied only on type-2 codebook, and not on type-1 codebook.

Figure 9:
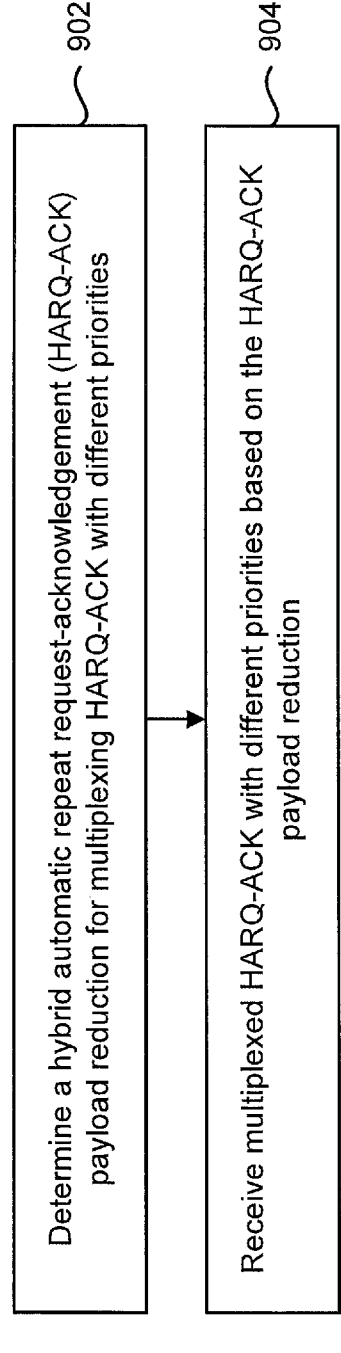
FIG. 9 is a flow diagram illustrating a method by a gNB for payload reduction of multiplexed HARQ-ACK with different priorities.

FIG. 9 is a flow diagram illustrating a method 900 by a gNB 160 for payload reduction of multiplexed HARQ-ACK with different priorities. The gNB 160 may determine 902 a hybrid automatic repeat request-acknowledgement (HARQ-ACK) payload reduction for multiplexing HARQ-ACK with different priorities. The gNB 160 may receive 904 multiplexed HARQ-ACK with different priorities based on the HARQ-ACK payload reduction.

Figure 10:
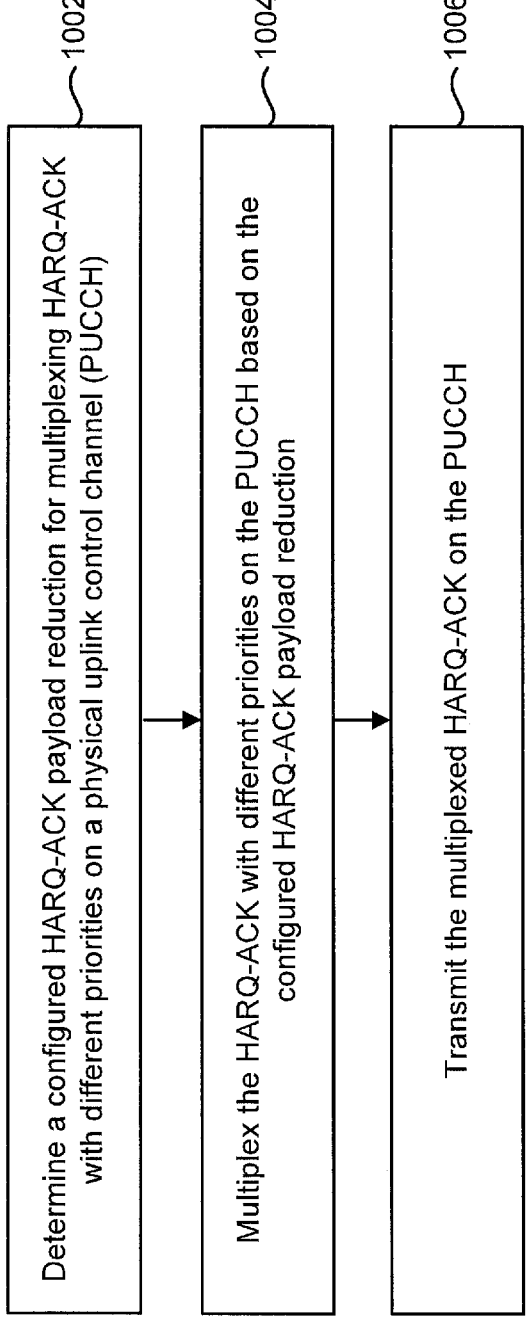
FIG. 10 is a flow diagram illustrating a method by a UE for payload reduction and configuration of multiplexed HARQ-ACK with different priorities on physical uplink control channel (PUCCH).

FIG. 10 is a flow diagram illustrating a method 1000 by a UE 102 for payload reduction and configuration of multiplexed HARQ-ACK with different priorities on physical uplink control channel (PUCCH). The UE 102 may determine 1002 a configured HARQ-ACK payload reduction for multiplexing HARQ-ACK with different priorities on a PUCCH. The UE 102 may multiplex 1004 the HARQ-ACK with different priorities on the PUCCH based on the configured HARQ-ACK payload reduction. The UE 102 may transmit 1006 the multiplexed HARQ-ACK on the PUCCH.

In some examples, low priority HARQ-ACK payload reduction on PUCCH may be configured by higher layer signaling. For example, several RRC parameters can be configured to support different levels of HARQ-ACK payload reduction. The RRC parameters may include harq-ACK-CBGBundlingPUCCH, harq-ACK-CBGtoTB-BundlingPUCCH, harq-ACK-SpatialBundlingPUCCH, and/or harq-ACK-GroupBundlingPUCCH. A RRC parameter harq-ACK-BundlingPUCCH may be configured to indicate the HARQ-ACK payload reduction method.

The UE 102 may determine the conditions to apply HARQ-ACK payload reduction on PUCCH. In a first approach (Approach 1), the UE 102 may evaluate HARQ-ACK payloads without the configured HARQ-ACK payload reduction. If no PUCCH resource can carry the HARQ-ACK bits, the UE 102 may apply the configured payload reduction on low priority HARQ-ACK. Multiple payload reduction methods can be configured. The UE 102 may evaluate and apply the least aggressive payload reduction method that can fit the PUCCH resource capacity.

In a second approach (Approach 2), the UE 102 may always apply payload reduction, if configured, on low priority HARQ-ACK first before performing HARQ-ACK multiplexing on PUCCH.

In a third approach (Approach 3), the payload reduction may be determined based on a configured payload threshold.

In a fourth approach (Approach 4), the payload reduction may be determined based on a UCI coding method.

In a fifth approach (Approach 5), the payload reduction may be determined based on a combination of a payload threshold and a UCI coding method.

Figure 11:
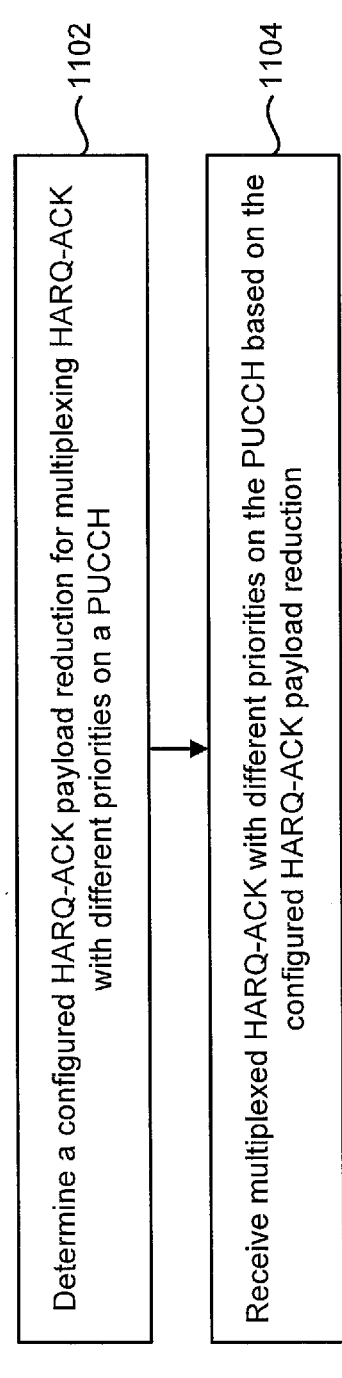
FIG. 11 is a flow diagram illustrating a method by a gNB for payload reduction and configuration of multiplexed HARQ-ACK with different priorities on PUCCH.

FIG. 11 is a flow diagram illustrating a method 1100 by a gNB 160 for payload reduction and configuration of multiplexed HARQ-ACK with different priorities on PUCCH. The gNB 160 may determine 1102 a configured HARQ-ACK payload reduction for multiplexing HARQ-ACK with different priorities on a PUCCH. The gNB 160 may receive 1104 multiplexed HARQ-ACK with different priorities on the PUCCH based on the configured HARQ-ACK payload reduction.

Figure 12:
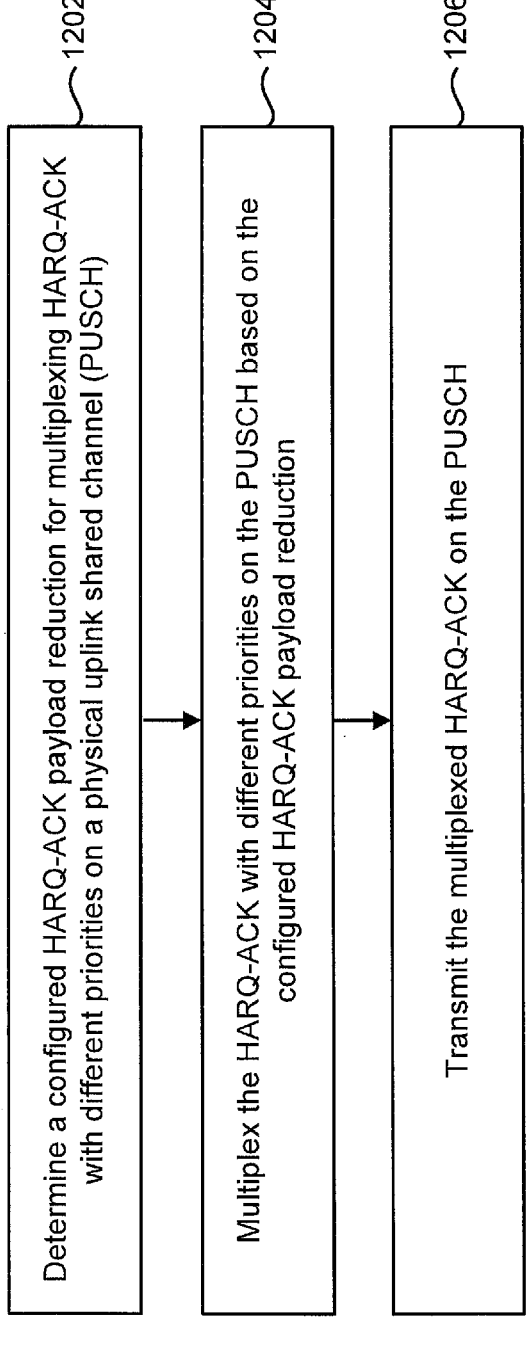
FIG. 12 is a flow diagram illustrating a method by a UE for payload reduction and configuration for HARQ-ACK multiplexing on a physical uplink shared channel (PUSCH).

FIG. 12 is a flow diagram illustrating a method 1200 by a UE 102 for payload reduction and configuration for HARQ-ACK multiplexing on a physical uplink shared channel (PUSCH). The UE 102 may determine 1202 a configured hybrid automatic repeat request-acknowledgement (HARQ-ACK) payload reduction for multiplexing HARQ-ACK with different priorities on a physical uplink shared channel (PUSCH). The UE 102 may multiplex 1204 the HARQ-ACK with different priorities on the PUSCH based on the configured HARQ-ACK payload reduction. The UE 102 may transmit 1206 the multiplexed HARQ-ACK on the PUSCH.

In some examples, low priority HARQ-ACK payload reduction on PUSCH may be configured by higher layer signaling. For example, several RRC parameters can be configured to support different levels of HARQ-ACK payload reduction. The RRC parameters may include harq-ACK-CBGBundlingPUSCH, harq-ACK-CBGtoTB-BundlingPUSCH, harq-ACK-SpatialBundlingPUSCH, and/or harq-ACK-GroupBundlingPUSCH. A RRC parameter harq-ACK-BundlingPUSCH may be configured to indicate the HARQ-ACK payload reduction method.

In some examples, payload reduction configuration may be performed for different PUSCH use cases. At least 3 cases may be considered: Case 1 includes a low priority HARQ-ACK on high priority PUSCH; Case 2 includes a high priority HARQ-ACK and low priority HARQ-ACK on high priority PUSCH; Case 3 includes a high priority HARQ-ACK and low priority HARQ-ACK on low priority PUSCH.

In a first approach (Approach 1), payload reduction method and parameters may be applied only when multiplexing of HARQ-ACK with different priorities on a single PUSCH.

In a second approach (Approach 2), the payload reduction method and parameters are applied only when the low priority HARQ-ACK is reported on a high priority PUSCH.

In a third approach (Approach 3), the payload reduction method and parameters are applied for all three cases.

In a fourth approach (Approach 4), the payload reduction methods and parameters may be configured independently for each use case.

Additionally, or alternatively, for a use case that supports low priority HARQ-ACK payload reduction, a payload threshold may be configured so that the payload reduction is performed only if the payload threshold is exceeded.

Figure 13:
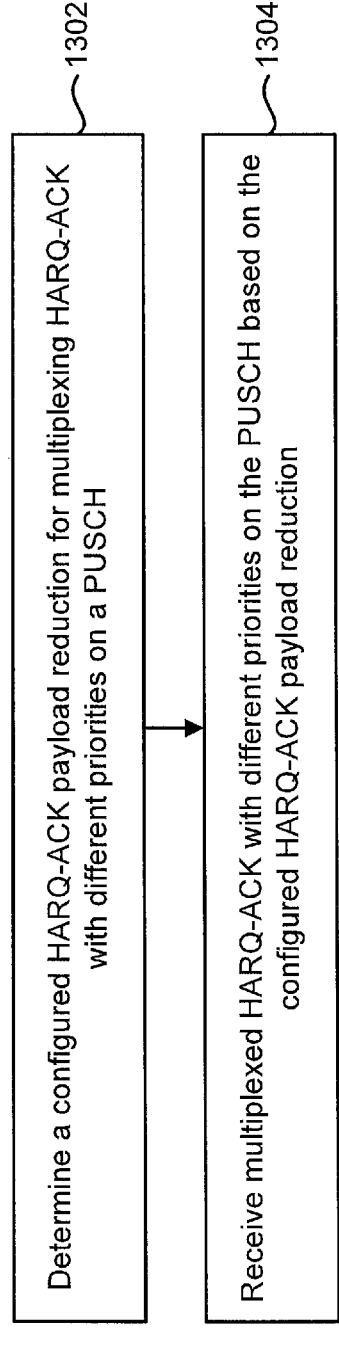
FIG. 13 is a flow diagram illustrating a method by a gNB for payload reduction and configuration for HARQ-ACK multiplexing on a PUSCH.

FIG. 13 is a flow diagram illustrating a method 1300 by a gNB 160 for payload reduction and configuration for HARQ-ACK multiplexing on a PUSCH. The gNB 160 may determine 1302 a configured hybrid automatic repeat request-acknowledgement (HARQ-ACK) payload reduction for multiplexing HARQ-ACK with different priorities on a PUSCH. The gNB 160 may receive 1304 multiplexed HARQ-ACK with different priorities on the PUSCH based on the configured HARQ-ACK payload reduction.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:
a processor configured to:
determine a hybrid automatic repeat request-acknowledgement (HARQ-ACK) payload size reduction for multiplexing different HARQ-ACKs having different priorities, the HARQ-ACK payload size reduction comprising applying at least one compression and bundling approach to the HARQ-ACKs based on the HARQ-ACKs' respective priorities, and
perform, for each HARQ-ACK, a HARQ-ACK bundling based on the HARQ-ACK's applied compression and bundling approach, the HARQ-ACK bundling for reducing a payload size of the corresponding HARQ-ACK.

2. The UE of claim 1, wherein a first compression and bundling approach comprises code block group CBG-level HARQ-ACK compression or bundling with a target CBG configuration.

3. The UE of claim 1, wherein a first compression and bundling approach comprises code block group (CBG) to transport block (TB)-level HARQ-ACK compression or bundling.

4. The UE of claim 3, wherein a CBG HARQ-ACK bit of a TB is bundled into one bit of a TB-level HARQ-ACK.

5. The UE of claim 1, wherein a first compression and bundling approach comprises spatial bundling between transport blocks (TBs) in a physical downlink shared channel (PDSCH) transmission.

6. The UE of claim 1, wherein a first compression and bundling approach comprises grouping HARQ-ACK bits based on a group size.

7. A base station (gNB), comprising:
a processor configured to:
determine a hybrid automatic repeat request-acknowledgement (HARQ-ACK) payload size reduction for multiplexing different HARQ-ACKs having different priorities, the HARQ-ACK payload size reduction comprising applying at least one compression and bundling approach to the HARQ-ACKs based on the HARQ-ACKs' respective priorities, a HARQ-ACK bundling being performed for each HARQ-ACK based on the HARQ-ACK's applied compression and bundling approach, the HARQ-ACK bundling for reducing a payload size of the corresponding HARQ-ACK; and
receiving circuitry configured to receive multiplexed HARQ-ACKs having different priorities based on the HARQ-ACK payload size reduction.

8. The gNB of claim 7, wherein a first compression and bundling approach comprises code block group (CBG)-level HARQ-ACK compression or bundling with a target CBG configuration.

9. The gNB of claim 7, wherein a first compression and bundling approach comprises code block group (CBG) to transport block (TB)-level HARQ-ACK compression or bundling.

10. The gNB of claim 9, wherein a CBG HARQ-ACK bit of a TB is bundled into one bit of a TB-level HARQ-ACK.

11. The gNB of claim 7, wherein a first compression and bundling approach comprises spatial bundling between TBs in a physical downlink shared channel (PDSCH) transmission.

12. The gNB of claim 7, wherein a first compression and bundling approach comprises grouping HARQ-ACK bits based on a group size.

13. A method by a user equipment (UE), comprising:

determining a hybrid automatic repeat request-acknowledgement (HARQ-ACK) payload size reduction for multiplexing different HARQ-ACKs having different priorities, the HARQ-ACK payload size reduction comprising applying at least one compression and bundling approach to the HARQ-ACKs based on the HARQ-ACKs' respective priorities; and performing, for each HARQ-ACK, a HARQ-ACK bundling based on the HARQ-ACK's applied compression and bundling approach, the HARQ-ACK bundling for reducing a payload size of the corresponding HARQ-ACK.

* * * * *